(12) United States Patent
Allyn et al.

(10) Patent No.: US 11,221,881 B2
(45) Date of Patent: Jan. 11, 2022

(54) COMPUTER RESOURCE LEAK DETECTION

(71) Applicant: MICROSOFT TECHNOLOGY LICENSING, LLC, Redmond, WA (US)

(72) Inventors: Barry Christopher Allyn, Snohomish, WA (US); Mert Ussakli, Seattle, WA (US); Benjamin Triet-Minh Nguyen, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/732,211

(22) Filed: Dec. 31, 2019

(65) Prior Publication Data
US 2021/0200593 A1 Jul. 1, 2021

(51) Int. Cl.
*G06F 9/46* (2006.01)
*G06F 11/30* (2006.01)
(Continued)

(52) U.S. Cl.
CPC ............ *G06F 9/5022* (2013.01); *G06F 12/00* (2013.01); *G06F 12/0261* (2013.01);
(Continued)

(58) Field of Classification Search
CPC ........ G06F 9/5022; G06F 9/50; G06F 9/5038; G06F 9/5027; G06F 9/526; G06F 9/5011;
(Continued)

(56) References Cited

U.S. PATENT DOCUMENTS

| 6,134,601 | A | * | 10/2000 | Spilo | .................. | G06F 9/50 |
| | | | | | | 719/328 |
| 6,275,857 | B1 | * | 8/2001 | McCartney | ........... | G06F 9/4843 |
| | | | | | | 707/999.202 |

(Continued)

OTHER PUBLICATIONS

Qian Wu et al., Iterative Mining of Resource-Releasing Specification, IEEE 2011, [Retrieved on Jul. 21, 2021], Retrieved from the internet: <URL: https://ieeexplore.ieee.org/stamp/stamp.jsp?tp=&arnumber=6100058> 10 Pages (233-242) (Year: 2011).*

(Continued)

*Primary Examiner* — Anibal Rivera
(74) *Attorney, Agent, or Firm* — NovoTechIP International PLLC

(57) ABSTRACT

Various embodiments discussed herein enable intelligent resource leak detection and associated user interface. In some aspects, if a kernel sends a tracing event (e.g., an ETW event) after a process or application has been requested to be shut down but before the process has actually been shut down, a resource leak can be detected. This is because the application should have requested the reference indicator to be removed in memory before the tracing event, as opposed to the kernel acting alone without an application request to remove the reference indicator. If a reference indicator has not been requested to be removed by the time this tracing event occurs, then it is indicative of the application never having sent a request to remove the reference indicator, which is indicative of a resource leak.

9 Claims, 24 Drawing Sheets

(51) Int. Cl.
*G06F 9/50* (2006.01)
*G06F 12/00* (2006.01)
*G06F 12/02* (2006.01)
*G06F 21/55* (2013.01)
*G06F 9/52* (2006.01)
*G06F 9/48* (2006.01)
*G06F 12/10* (2016.01)

(52) U.S. Cl.
CPC .......... *G06F 21/556* (2013.01); *G06F 9/4843* (2013.01); *G06F 9/50* (2013.01); *G06F 9/505* (2013.01); *G06F 9/5011* (2013.01); *G06F 9/5027* (2013.01); *G06F 9/5038* (2013.01); *G06F 9/526* (2013.01); *G06F 12/023* (2013.01); *G06F 12/10* (2013.01)

(58) Field of Classification Search
CPC ........ G06F 9/4843; G06F 9/505; G06F 12/00; G06F 12/0261; G06F 12/023; G06F 12/10; G06F 21/556; G06F 11/3034; G06F 11/3648; G06F 11/073; G06F 11/3065; G06F 11/3404
See application file for complete search history.

(56) References Cited

U.S. PATENT DOCUMENTS

| | | | | |
|---|---|---|---|---|
| 6,799,208 | B1* | 9/2004 | Sankaranarayan | G06F 9/50 709/223 |
| 7,058,947 | B1* | 6/2006 | Raja | G06F 9/5027 709/223 |
| 7,111,297 | B1* | 9/2006 | Sankaranarayan | G06F 9/5038 709/223 |
| 7,137,119 | B1* | 11/2006 | Sankaranarayan | G06F 9/5011 718/103 |
| 7,284,244 | B1* | 10/2007 | Sankaranarayan | G06F 9/5027 718/103 |
| 7,293,142 | B1* | 11/2007 | Xu | G06F 11/3648 707/999.202 |
| 8,880,757 | B1* | 11/2014 | Cardona | G06F 11/3065 710/22 |
| 9,760,464 | B1* | 9/2017 | Helliwell | G06F 11/073 |
| 9,824,005 | B1* | 11/2017 | Helliwell | G06F 12/023 |
| 2002/0194251 | A1* | 12/2002 | Richter | G06F 9/5011 718/105 |
| 2003/0046396 | A1* | 3/2003 | Richter | G06F 9/505 709/226 |
| 2005/0235127 | A1* | 10/2005 | Muthiah | G06F 11/3648 711/170 |
| 2009/0198943 | A1* | 8/2009 | Yahagi | G03F 7/70508 711/170 |
| 2010/0031264 | A1* | 2/2010 | Ito | G06F 12/0253 718/102 |
| 2010/0058351 | A1* | 3/2010 | Yahagi | G06F 9/5022 718/104 |
| 2010/0085870 | A1* | 4/2010 | Barsness | G06F 11/3404 370/221 |
| 2018/0307585 | A1* | 10/2018 | Mulder | G06F 3/067 |
| 2019/0213068 | A1* | 7/2019 | Upadhyay | G06F 11/3034 |

OTHER PUBLICATIONS

Ziying Dai et al., Resco: Automatic Collection of Leaked Resources, 2013, [Retrieved on Jul. 21, 2021], Retrieved from the internet: < URL: https://www.jstage.jst.go.jp/article/transinf/E96.D/1/E96.D_28/_pdf> 12 Pages (28-39) (Year: 2013).*

"International Search Report and Written Opinion Issued in PCT Application No. PCT/US2020/061895", dated Apr. 28, 2021, 16 Pages.

* cited by examiner

FIG. 6.

| Insights | | | | | |
|---|---|---|---|---|---|
| Time | Activity | Description | Bug | Count | More Info |
| 11:27:35am 3-14-2019 | | ▷ Module reloaded due to CoreLibrary() call | create | 7 | |
| 12:42:42pm 3-14-2019 | | Soft hang detected (656 ms) in CreateObjectsLO -> Lfo::UIColor::Details::W... | create | 1 | |
| 2:05:14pm 3-14-2019 | | Soft hang detected (1182.39 s) in IOPort::InitItems -> QueuedCompl... | create | 1 | |
| 2:24:55pm 3-14-2019 | Office.FileIO.M... | Soft hang detected (4.34 s) in CTaskManager::RunTaskWorkBag -> 'D... | 15677 (New) | 10 | |
| 2:25:02pm 3-14-2019 | | ▷ Registry access is excessive | create | 1 | |
| 2:25:03pm 3-14-2019 | PowerPoint File... | Wait time did not meet expectation (expected: <5000ms, actual: 6248ms) | create | 2 | |
| 3:04:43pm 3-14-2019 | | Soft hang detected (2.98 s) in KiUserCallbackDispatcherContinue -> ___ fnINOU... | cre| | Ctrl+Click to create a new bug for this issue |
| 10:42:25am 3-15-2019 | | Soft hang detected (766 ms) in Lfo::Effects::Listener::MainLi... | cre | 1 | Press F5 to refresh |
| 10:42:26am 3-15-2019 | | Soft hang detected (1.27 s) in HandleSystemEventMessage -> FTS::LRSysRe... | cre | 1 | |
| 11:11:11am 3-15-2019 | | Sleep(105) call detected on main thread | create | 2 | |
| 11:11:11am 3-15-2019 | | Sleep(110) call detected on main thread | create | 1 | |
| 11:11:11am 3-15-2019 | | Sleep(120) call detected on main thread | | | |

*FIG. 12.*

COMPUTER RESOURCE LEAK DETECTION

INTRODUCTION

When an application requests a computer resource (e.g., a process, a graphics object identifier (GDI) object, a network socket, a file, etc.), a reference indicator (e.g., a handle) is typically used. A "reference indicator" is a structure or identifier (e.g., a process identifier (PID), a GDI object identifier, a network socket ID, a file descriptor, etc.) that references a specific corresponding computer resource. A well-functioning application typically removes or releases reference indicators that it no longer requires, which frees up computer resources, such as memory, and ensures that the operating system does not end up managing a resource that is not in use. For example, an application may request a particular file and the file descriptor may be needed to access the file. After access of the file, the application may request removal of the file descriptor in memory causing the file descriptor to be deleted.

In some instances, applications fail to request or cause reference indicators to be removed, which leads to a resource leak. A resource leak occurs when an application opens or causes a reference indicator to be generated for a computer resource but fails to close or otherwise cause the reference indicator to be terminated when the reference indicator is no longer needed. Consequently, resource leaks can potentially reduce computing performance (e.g., increase Central Processing Unit (CPU) utilization and memory consumption), and/or cause application or system crashes, among other things. Some profilers and other technologies fail to adequately detect resource leaks, such as GDI and USER handle leaks, and other performance issues and do not provide intuitive user interfaces and other related functionality.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein enable intelligent resource leak detection and associated user interfaces. For example, if a kernel sends a tracing event (e.g., an Event Tracing for Windows (ETW) event) after a process or application has been requested to be shut down but before the process has actually been shut down, a resource leak can be detected. This is because the application should have requested the reference indicator to be removed in memory before the tracing event, as opposed to the kernel acting alone without an application request to remove the reference indicator. If a reference indicator has not been requested to be removed by the time this tracing event occurs, then it is indicative of the application never having sent a request to remove the reference indicator, which is indicative of a resource leak.

Various embodiments include other functionality such as determining and presenting: call stacks of the performance issue indicated, types or categories of reference indicators, a count or identity of all of the reference indicators still active that have not been terminated, and a count or identity of all reference indicators that have been terminated. For example, embodiments can map, via a data structure, each handle to a handle category and present both the handle and handle category to a user device so that the user can quickly determine the types of handles that have been created or destroyed for a currently running process.

Existing technologies, such as profilers, have various shortcomings. For example, existing tools do not detect GDI or USER object resource leaks, require instrumentation, or are sandboxed, and cause an unnecessary amount of computing resource consumption, such as memory and CPU. Various embodiments of the present disclosure improve these existing technologies by intelligently detecting resource leaks and generating: associated call stacks, types or categories of reference indicators, a count or identity of all of the reference indicators still active that have not been destroyed, and a count or identity of all reference indicators that have been destroyed. Some embodiments of the present disclosure also improve these technologies by rendering an intelligent user interface that does not require users to drill down several layers to navigate to relevant information. Some embodiments also improve these technologies by automating functionality via particular rules and improve computing resource consumption, such as memory, CPU, and the like.

BRIEF DESCRIPTION OF THE DRAWINGS

The present invention is described in detail below with reference to the attached drawing figures, wherein:

FIG. 6 is a screenshot of a user interface illustrating a history of Dynamic-Link Libraries (DLL) activity and attributes them to a corresponding call stack, in accordance with some embodiments;

FIG. 12 is a screenshot of a user interface indicating performance issues detected and bug generation functionality, in accordance with some embodiments;

DETAILED DESCRIPTION

Figure 1:
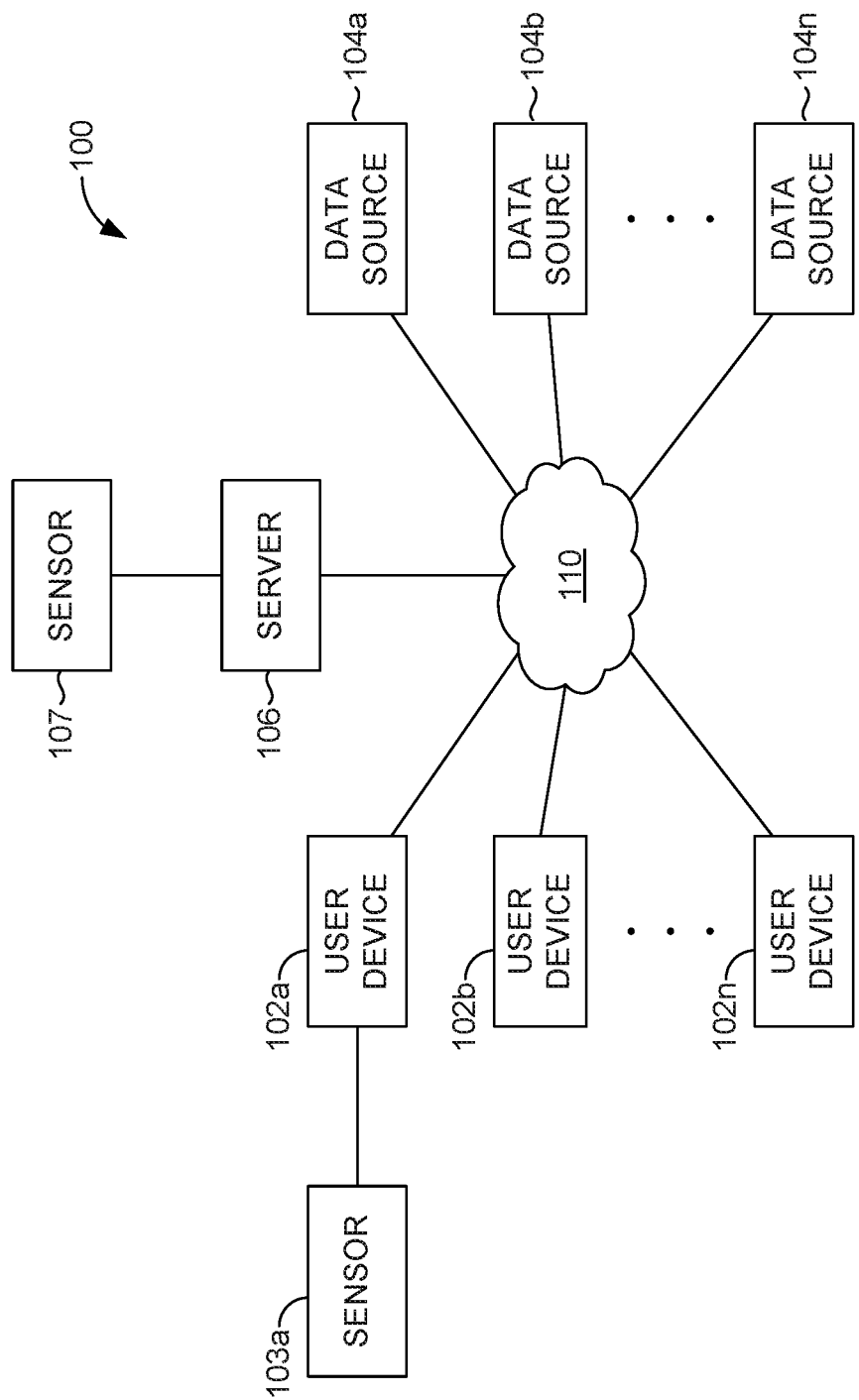
FIG. 1 is a block diagram of an example system, in accordance with some embodiments.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As used herein, the term "set" may be employed to refer to an ordered (i.e., sequential) or an unordered (i.e., non-sequential) collection of objects (or elements), such as but not limited to data elements (e.g., events, clusters of events, and the like). A set may include N elements, where N is any non-negative integer that is 1 or greater. That is, a set may include 1, 2, 3, . . . N objects and/or elements, where N is an positive integer with no upper bound. Therefore, as used herein, a set may include only a single element. In other embodiments, a set may include a number of elements that is greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A. As further used herein, the singular forms "a," "an," and "the" include plural referents unless the context clearly dictates otherwise. Thus, for example, reference to "a reference indicator" includes reference to one or more of such reference indicators.

Software performance engineering (SPE) is the set of tasks or activities performed across the software development life cycle (SLDC) to ensure that requirements for performance (e.g., memory utilization, latency, throughput) are met for an application. For example, SPE may include defining the requirements (e.g., performance policies and scalability requirements), defining and building the architecture design to meet performance policies (e.g., generating boot activities that do not hang over a threshold), testing performance to validate the performance policies, and utilizing performance monitoring to continuously assess application performance. Accordingly, SPE helps software applications meet specific requirements and limits bugs or other performance issues before the software applications become fully deployable.

Tools, such as profilers, can be used for testing performance of an application but they do not adequately detect and present performance issues. Various embodiments described herein enable performance issue detection and associated functionality. A "performance issue" as described herein refers to a performance metric value (e.g., network utilization percentage, CPU utilization percentage, quantity of hangs, etc.) that has exceeded a threshold or violated one or more policies (e.g., the network utilization is above a percentage threshold) for one or more processes. Performance is thus indicative of a certain computing resource (e.g., CPU, memory, threads) utilization value output that can fall inside or outside of a threshold (becoming an issue or not an issue). In some aspects, a "process" includes one or more instructions, routines, or instances of an application that are currently being processed by one or more computer processors.

Some embodiments of the present disclosure intelligently detect resource leak performance issues. A "resource leak" as described herein refers to a reference indicator that an application fails to request closure or termination of in memory. For example, a user may open a graphics application to input text and draw a picture. In response to a user requesting a particular brush (e.g., a watercolor brush via a selection of a corresponding button), a GDI brush reference indicator may be generated. The user may then draw a picture with the brush. The user may then request a particular text font (e.g., via selection of another button) to input text next to the brush, which causes another reference indicator (e.g., a text handle) to be generated. However, the application may incorrectly leave the GDI brush reference indicator in memory even though the user has finished using the brush or the application has been requested to be shut down, which is indicative of a resource leak. In some embodiments, a resource leak is determined the moment (or shortly after) a shutdown request of an application is received (e.g., by a kernel) because by the time a shutdown request is received, an application should have requested all of the resource indicators to be closed or terminated. In alternative embodiments, a resource leak is determined when the reference indicator is no longer needed by an application (which may occur before a shutdown request of an application). Specifically, a resource leak may be determined at the moment (or particular time period after) a user selects a second computer resource different from or unrelated to a first selected computer resource for which a resource indicator has been generated but has not been removed. For example, using the illustration above, a resource leak can be determined the moment at or shortly after (e.g., 2 seconds) the user requests a particular text font because the GDI brush reference is still located in memory but it is no longer needed.

In some instances, detection of resource leaks is based on operating system kernel (also referred to herein as "kernel") and/or process behavior. In various embodiments, indications that kernels alone are responsible for removing (also referred to herein as "terminating," "destroying," or "freeing") resource indicators are indicative of memory leaks. This is because reference indicators, such as Graphics Device Interface (GDI) objects, that an application does not explicitly free or terminate may eventually be forcefully freed by the kernel once the kernel closes the process. This force-freeing behavior by the kernel acts as a safety net so that the resource leak will not persist beyond the termination of the application even if the application does not request removal of the reference indicator. For example, if a kernel sends a tracing event (e.g., an ETW event) after a process has been requested to be terminated but before the process has actually been terminated to announce that a GDI handle is about to terminate, this is indicative of a resource leak. This is because the application should have requested the handle to be terminated before the tracing event, as opposed to the kernel acting alone without an application request to terminate the handle. Embodiments can use tracing events or other messages as a marker to determine resource leaks. If a reference indicator has not been requested to be freed by the time this tracing event occurs, then it is indicative of the application never having sent a request to free the reference indicator and thus indicative of a resource leak.

In some embodiments, the type/category (and sub-category) of reference indicators can be determined and intelligently presented to a user device. For instance, a hash table or other data structure can be used to map specific handles to a category. In an illustrative example, a mapping can be generated that maps fonts and brush handles to a "GDI" category, and the handles can be presented under the category in a user interface. This allows the user to quickly see what types of handles are causing performance issues. In some embodiments, the reference indicators are at least one of: a graphics object identifier (e.g., a GDI object identifier) and a user handle. In some embodiments, a graphics object identifier includes an application programming interface or other reference indicator of an operating system. In some embodiments, the graphics object identifier is generally responsible for representing a specific graphical object (e.g., a font, bitmap, brush, pen, or device context (drawing surface), etc.) and transmitting them to output devices (e.g., monitors and printers). Graphics object identifiers enables applications to use graphics and formatted text. For example, a graphics object identifier can be responsible for tasks such as drawing lines or curves, fonts, brushes, colors, sizes, and handling palettes. A graphics object identifier is not a user handle in particular embodiments. A user handle generally represents a user interface element (e.g., a desktop, a window (and all elements within a window), a menu (and all the elements within a menu), a cursor, a set of icons, a set of buttons, and the like).

In some embodiments, all reference indicators that have been generated can also be determined and intelligently presented to user devices. For example, embodiments can request the quantity of all reference indicators that have been generated from an operating system kernel. The operating system kernel can, for example, access in a table (e.g., an array index) an indication of all handles that have been created for a currently running process but have not yet been terminated. Likewise, some embodiments also determine which reference indicators have been terminated or otherwise removed for a currently running process using the operating system kernel as described above.

In some embodiments, the specific source of a resource leak or other performance issue can be determined by using call stacks and presenting them to user devices. Performance issues can first be detected and then call stacks can be queried to determine the specific call stack location of where the performance issue was detected. For example, the system can detect that a hang has exceeded a threshold or cost (e.g., 1 second) for a MICROSOFT POWERPOINT process in response to a user copying and pasting characters in the application. A "hang" as described herein refers to the situation where a message or request sits beside a message passing component (e.g., a message pump, event loop, or message dispatcher) greater than a threshold quantity of time. These components typically move messages or requests from a message queue into an application for processing. This message removal from queue data structures can be delayed when there are problems, such as an infinite loops or recursion, a slow network, threads waiting for events that will never occur, or throttling to name a few. Colloquially, hangs correspond to a "freeze" event where a request stalls and the system consequently no longer takes input. For example, a hang can occur when a user selects a GUI feature such that the GUI no longer takes input because it is still processing the GUI feature selection.

When a performance issue, such as a resource leak is detected, a call stack can be queried to see exactly what may be causing the performance issue and where in developer code the leak is occurring. A "call stack" refers to a stack data structure (a LIFO) that stores information about active subroutines or instances (e.g., methods, functions, or procedures) of an application. In some embodiments, an "active" instance, such as an active function, is one that has not yet returned any values (e.g., to the function that called it), or has yet to complete execution (e.g., such as a Python language "print" function that has not yet displayed data). Accordingly, for example, active instances may be those that have called other instances but have not received corresponding values back from those other instances or those in which the instance is actively performing an algorithm. Call stacks help users keep track of the point or location at which active instances should return control when it finishes executing.

Each call stack contains entries or stack units. A "stack unit" (e.g., a stack frame or activation record) as described herein is a collection of data on the call stack associated with a single subroutine or instance call, such as a function call and its argument data. In some embodiments, the stack unit includes the return address (location directly after where a subroutine is called), argument variables or parameters passed on the stack (e.g., 100 where variable X=100, and 100 is passed into method from caller), local variables (exists within the current method), and/or code line number. In various instances, each time a function is called, a new stack unit is generated or pushed onto the stack, and each time a function returns, the frame for that function is eliminated or popped of the stack. If a function is recursive, there can be many stack instances for the same function. In this way, when a performance issue is detected, the corresponding call stack can be presented to the user so the user can view the exact source or call responsible for the performance issue.

Existing technologies, such as profilers and other tools, have various shortcomings. For instance, WINDOWS PERFORMANCE ANALYZER (WPA) or other profilers typically process ETW events by statically populating event history, leaving it up to the user to manually determine if there was a leak or not. Other technologies sample code or invade a process in order to instrument the corresponding code. Instrumentation technologies insert special code at the beginning and end of each routine or otherwise try to hook into all calls to record when the routine starts and exits. Code sampling technologies record currently-executed instructions at certain time slices without injecting special code or hooking. All of this functionality may allow the tools to detect some performance issues and provide limited measurement functionality. However, this instrumentation and sampling functionality tends to be passive and static in that it essentially records inputs and outputs of code, leading to the inability to detect a resource leak. For example, existing technologies may report false positives by falsely indicating that there is no resource leak because it is passively observed that handles were freed or otherwise removed. However, just because a handle is freed does not mean that there is not a resource leak. As described above, if applications do not request a handle or other reference indicator to be removed, the kernel may automatically remove the handle at process shutdown. Thus, although the handle is removed, there is still likely a resource leak because the application never requested the handle to be removed. Moreover applications are increasingly becoming sandboxed. Consequently, hooking into code or instrumenting is becoming difficult, leading to inaccurate results.

Various embodiments of the present disclosure improve these existing technologies via new functionalities that these existing technologies or computing devices do not now employ. For instance, some embodiments improve these technologies by intelligently detecting resource leaks, without invasive instrumentation or other code injection. For example, some embodiments receive an indication that the kernel (or application) was responsible for removing a reference indicator and determine that a process has not requested the reference indicator to be removed to detect resource leaks. Some embodiments also improve these technologies by rendering an intelligent user interface that does not require users to drill down several layers to get to relevant information. For example, some embodiments provide a full view user interface where the call stack, performance data, and performance issues are immediately viewable on a single page or view (e.g., FIG. 5). This is a highly intuitive interface that does not require the user to navigate through several windows or views like existing technologies, thereby speeding up navigation for the user. Moreover, in some embodiments, the full view includes highly intuitive tabs that represent performance data categories. These tabs allow a user to quickly and conveniently switch back and forth between each performance data resource to rapidly spot information of interest. For example, some embodiments have a "modules" tab, "threads" tab, "registry" tab, and "file I/O" tab, which allows the user to quickly locate associated information.

Some embodiments of the present disclosure improve these technologies because of functionality that determines and presents: call stacks of the performance issue indicated, types or categories of reference indicators, a count or identity of all of the reference indicators still active that have not been destroyed, and a count or identity of all reference indicators that have been destroyed. Without this information, it may be hard to infer resource leaks, which can cause resource consumption issues, as described herein.

Some embodiments of the present disclosure also improve existing technologies by automating tasks (e.g., performance issue monitoring, detecting resource leak performance issues in call stacks, etc.) via certain rules (e.g., naming specific processes in hydra-mode before process is launched or rules indicated in a policy file, as described in more detail below). Such tasks are not automated with particular rules in various existing technologies and have only been historically performed by humans or manual input of users that have not used such rules. In particular embodiments, incorporating these certain rules improve existing technological processes by allowing the automation of these certain tasks with the new functionality described herein.

Existing technologies also cause an unnecessary amount of computing resource consumption. For example, because existing technologies may not detect resource leaks, reference indicators may be stuck in memory if and until the kernel removes the reference indicator. In a resource leak situation it is typical for an application to fail to remove several (e.g., tens of thousands) reference indicators, which continue to be stored in memory while the application is running. This can cause: the application to crash, too much memory to be consumed, or CPU execution to be bottlenecked or otherwise over-utilized, thereby causing an unnecessary amount of resources to be consumed. In another example, the manual human intervention and drilling down of several layers required by existing technologies are more likely to cause performance issues to be missed and passed at the deployment stage because there are more likely to be bugs or other errors with the application. This may cause unnecessary threads to be run, hangs to occur, and the like, which not only degrades the deployed application, but the underlying computer that runs the application, thus consuming an unnecessary amount of computing resources, such as increased CPU utilization.

Various embodiments of the present disclosure improve unnecessary computing resource consumption by detecting resource leaks and providing indications of the leaks to user devices such that the corresponding reference indicators are removed from memory. Such removal frees up memory resources, causes the CPU to not be as over-utilized, and the like. Also, because intelligent user interfaces are rendered, it is less likely that performance issues will be missed and passed at the deployment stage. Accordingly, performance issues can be more easily logged as a bug and fixed, thereby leading to optimized computing system performance.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources (e.g., databases or other data stores), such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 1900 as described in connection to FIG. 19, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. In some embodiments, the one or more servers 106 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the network 110.

In some embodiments, a user device 102a and/or server 106 may include performance issue tools or logic to detect performance issues and any other functionality described herein. For example, the user device 102 may have a process or application installed, as well as a performance issue detection tool (e.g., the application 1408 of FIG. 14). In some embodiments, in response to the process or application activating or launching, the performance tool may automatically generate performance metrics. In some embodiments, the performance issues are then detected such that a user device 102a logs the performance issue as a bug, which is then automatically routed to the server 106 and/or another user device 102(b) via the network 110 so that users can crowdsource bug generation, as described herein.

In some embodiments, a user device 102a or server 106, alternatively or additionally, comprises one or more web servers and/or application servers to facilitate delivering web or online content to browsers installed on a user device 102b. Often the content may include static content and dynamic content. When a client application, such as a web browser, requests a website or web application via a URL or search term, the browser typically contacts a web server to request static content or the basic components of a website or web application (e.g., HTML pages, image files, video files, and the like.). Application servers typically deliver any dynamic portions of web applications or business logic portions of web applications. Business logic can be described as functionality that manages communication between a user device and a data store (e.g., a database). Such functionality can include business rules or workflows (e.g., code that indicates conditional if/then statements, while statements, and the like to denote an order of processes).

User devices 102a and 102b through 102n may comprise any type of computing device capable of use by a user. For example, in one embodiment, user devices 102a through 102n may be the type of computing device described in relation to FIG. 19 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100 or system 200 described in connection to FIG. 2. Examples of data source(s) 104a through 104n may be one or more of a database, a file, data structure, or other data store. Data sources 104a and 104b through 104n may be discrete from user devices 102a and 102b through 102n and server 106 or may be incorporated and/or integrated into at least one of those components. In one embodiment, data sources 104a through 104n comprise sensors (such as sensors 103a and 107), which may be integrated into or associated with the user device(s) 102a, 102b, or 102n, or server 106.

Figure 2:
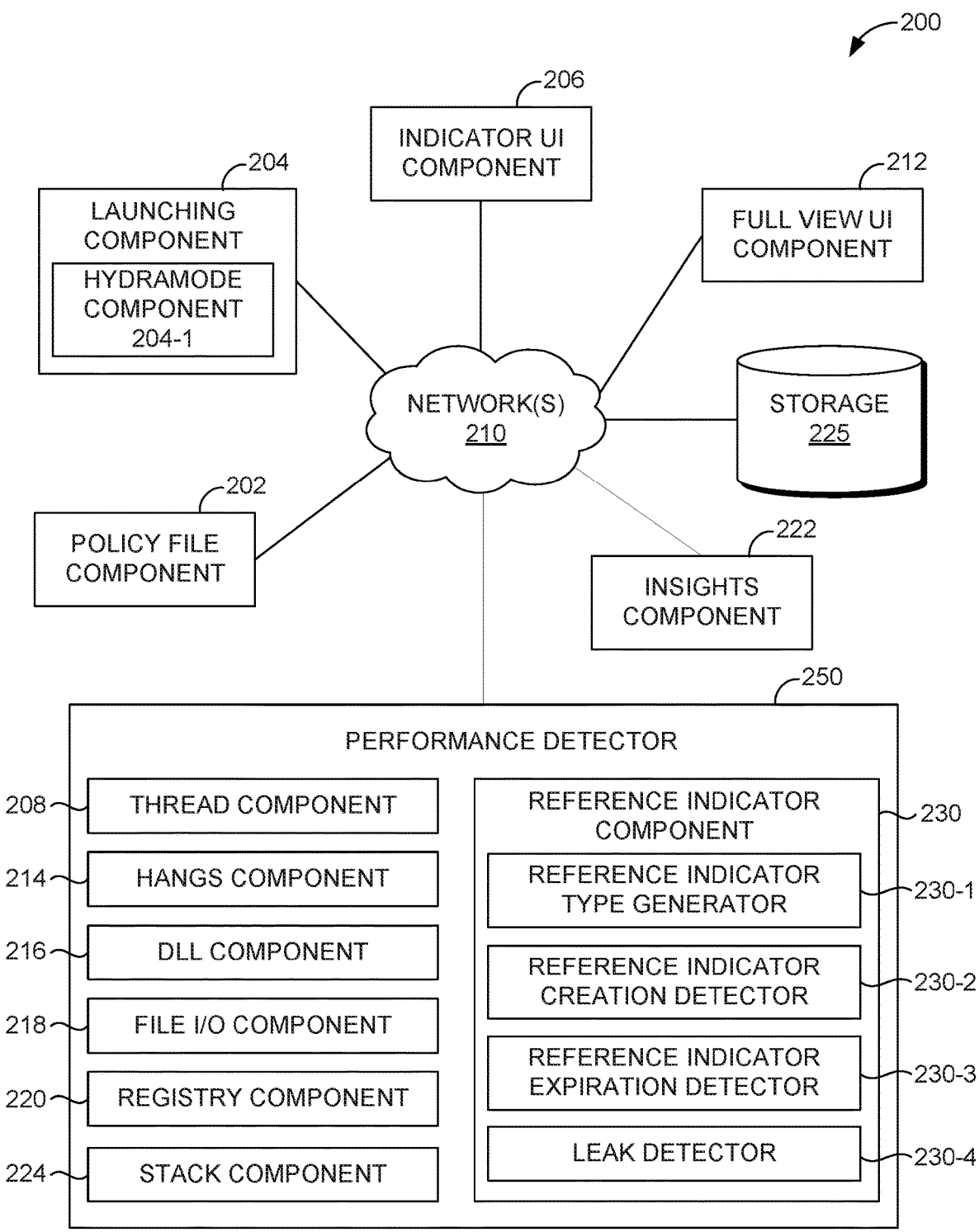
FIG. 2 is a block diagram of an example computing system architecture, in accordance with some embodiments.

Operating environment 100 can be utilized to implement one or more of the components of the system 200, described in FIG. 2. Operating environment 100 also can be utilized for implementing aspects of process flows 1400, 1500, and 1600 described in conjunction with FIGS. 14, 15, and 16, and any other functionality as described in FIGS. 2-13, and 17.

Referring now to FIG. 2, in conjunction with FIG. 1, a block diagram is provided showing aspects of an example computing system architecture suitable for implementing an embodiment of the disclosure and designated generally as the system 200. The system includes the policy file component 202, the launching component 204, the indicator UI component, and the performance detector 250. Generally, embodiments of system 200 enable or support a performance tool to detect performance issues, detect resource leaks, and logging bugs, among other things. System 200 is not intended to be limiting and represents only one example of a suitable computing system architecture. Other arrangements and elements can be used in addition to or instead of those shown, and some elements may be omitted altogether for the sake of clarity. Further, as with operating environment 100 of FIG. 1, many of the elements described herein are functional entities that may be implemented as discrete or distributed components or in conjunction with other components, and in any suitable combination and location. For instance, the functionality of system 200 may be provided via a software as a service (SAAS) model, e.g., a cloud and/or web-based service. In other embodiments, the functionalities of system 200 may be implemented via a client/server architecture.

The policy file component 202 is generally used to set policies or thresholds that define performance issues. For example, a user may indicate in a policy file that a performance issue is not to be reported or displayed unless a hang is over a threshold quantity of hang time (e.g., 200 MS). The policy file is described in more detail below. The launching component 204 configures performance tool settings. For example, before an application or process is run, a user may indicate, via the launching component 204, the time at which the performance tool will attach or engage in performance readings for the application or process once the application or process runs. The hydra mode component 204-1 causes the performance tool to automatically run on top of potentially several processes when those processes are initiated or launched. For example, an ETL file user can input several applications in a field of a graphical user interface, which causes the performance tool to automatically run upon the running of those several applications.

The indicator UI component 206 is responsible for generating a summary view of each performance metric analyzed for a process. For example, the UI components can be a small window, UI, or dialog box that lists CPU utilization, number of resource leaks, number of hangs, memory utilization, number of modules running, number of threads running, number of performance issues detected, and the like. The summary view in certain aspects tends to be a shortened view with little text or strings relative to a full view user interface such that a user can quickly scan the indicator UI component 206 to get a general sense of process performance. Some embodiments of the UI component 206 are described in more detail below.

The full view UI component 212 generates a detailed view of performance metrics analyzed, call stack information, and performance issues detected. In some aspects, the full view UI component 212 provides much more detailed information relative to the indicator UI component 206. In this way, for example, the user can see exactly where in a call stack the performance issue lies and if the performance issue has been logged as a bug by another team or user. Certain embodiments of the full view UI component 212 are described in more detail below.

The performance detector 250 is generally responsible for tracking computing resource metrics and generating indications of such metrics so as to cause presentation of the indications. The performance detector 250 includes the thread component 208, the hangs component 214, the DLL component 216, the file I/O component 218, the registry component 220, the stack component 224, and the reference indicator component 230.

The thread component 208 is generally responsible for detecting a thread count and generates associated data, which is described in more detail below in accordance with some embodiments. The hangs component 214 is responsible for detecting the quantity of hangs that have occurred, the quantity of time that hangs have taken, and/or other information associated with hangs and generates associated data. Various embodiments of the hangs component 214 are described in more detail below. The DLL component 216 is generally responsible for detecting whether Dynamic-Link Libraries (DLL) have been loaded or unloaded and generates data associated with DLLs. Some embodiments of the DLL component 216 are described in more detail below.

The file I/O component 218 is responsible for detecting the quantity of reads and/or writes to one or more files and generates other data associated with files. Some embodiments of the file I/O component 218 are described in more detail below. The registry component 220 generally detects a quantity of reads and/or writes to a registry or other data store where settings, options, or other values of an operating system can be changed or read and generates associated data. Various embodiments of the registry component 220 are described in more detail below.

The reference indicator component 230 is generally responsible for detecting resource leaks and generating counts for reference indicators (e.g., reference indicators that have been created but not yet removed from memory) and expired reference indicators (i.e., reference indicators that have been destroyed). The reference indicator component 230 includes the reference indicator type generator 230-1, the reference indicator creation detector 230-2, the reference indicator expiration detector 230-3, and the leak detector 230-4.

As described herein, a reference indicator is a structure or identifier that references a computing resource or computing resource feature (e.g., an object or block of memory on disk). Reference indicators provide a layer of abstraction between system resources and applications and are typically managed by a computer's operating system via a data structure (e.g., a handle table) that maps each reference indicator to a computing resource. These reference indicators typically map to structures that describe objects or resources (e.g., a particular GDI font object) in the abstract. Reference indicators are thus abstractions of a reference that are managed externally (e.g., via a database or an operating system). Reference indicators can therefore map to specific resources themselves or the important details of resources without containing all of the unnecessary details of resources. In various embodiments, each process or application has several specific reference indicators because there are several features or objects of each process. Typically, each time a particular resource or object is called (e.g., to render for display), a reference indicator is generated or used for the resource. For example, for every window, menu, button, or other user interface feature that an application includes, there can be a corresponding handle that is generated when the specific feature is requested (e.g., to be displayed) or called. Certain reference indicators, such as handles, may be opaque identifiers (e.g., integer number in an array index or handle table). Typical resource handles can be GDI object IDs, file descriptors, network sockets, database connections, PIDs, and job IDs.

In certain situations, reference indicators are not pointers used in memory for memory leak detection and other memory processes. While a pointer includes the address of the resource to which it refers, a reference indicator may be an abstraction of the resource and it does not necessarily contain the address of the resource. Resources referred to by a reference indicator can be relocated in memory without invalidating the reference indicators, which does not happen with pointers. That is to say, if a pointer is reallocated in memory it is invalidated and contains the new address. Although certain existing technologies perform functionality, such as memory leak detection, in certain instances memory leaks are not resource leaks, such as handle leaks. A memory leak occurs when a process asks for a pointer to a memory address but does not free the pointer. A pointer in certain instances is not a handle or reference indicator as described above.

The reference indicator type generator 230-1 is generally responsible for generating a mapping of reference indicator or reference indicator type to a particular category and generates associated data, such as is used in a user interface. For example, each known type or specific handles can be listed in a data structure, such as a hash map where the specific handles are mapped to one or more categories. In some embodiments, the data structure represents a lookup table or similar structure where each mapping can be determined by looking at the key and associated values. For example, each identifier for each handle of a currently running process can be looked up as a key and then mapped to a category value. In an illustrative example, a brush or font GDI handle can be mapped to a "GDI" category, which is indicative that the specific handles belong to a particular graphics module or functionality within a process. In response to this mapping, a graphical user interface or values associated with a graphical user interface can be populated, as described, for example, with respect to columns 1304 and 1306 of FIG. 13A.

The reference indicator creation detector 230-2 is responsible for detecting the quantity or counts of each reference indicator/reference indicatory types that have been generated for a currently running process. For example, the reference indicator creation detector 230-2 can determine that 30 handles were created for handle type A but were never destroyed. This detection can occur via any suitable method. For example, a process can request a resource and corresponding reference indicator from a kernel at which point the kernel may generate a record in a reference indicator table (e.g., a handle table) that generates the reference indicator and a mapping of a corresponding resource. The kernel may then send a message back to the process that made the request indicative of a notification that the reference indicator has been generated. This activity can be traced from the handle creation detector 230-2 at which point, it causes data of a user interface to be generated (e.g., count values under the columns 1308 and/or 1312 of FIG. 13A). Alternatively, the message that the kernel sends can be logged to a file that is read by the reference indicator creation detector 230-2 or is sent directly to the reference indicator creation detector 230-2 itself from the kernel.

The reference indicator expiration detector 230-3 generally detects the quantity or counts of each outstanding reference indicator/reference indicatory types that have been terminated for a currently running process. This detection can occur via any suitable method. For example, a process can send a request to a kernel for a reference indicator to be terminated at which point the kernel may remove a record in a reference indicator table that removes the reference indicator and a mapping of a corresponding resource. The kernel may then send a message back to the process that made the request indicative of a notification that the reference indicator has been terminated. This activity can be traced from the reference indicator expiration detector 230-3 at which point, it causes data of a user interface to be generated (e.g., count values under the columns 1310 and/or 1314 of FIG. 13A). Alternatively, the message that the kernel sends can be logged to a file that is read by the reference indicator expiration detector 230-3 or is sent straight to the reference indicator expiration detector 230-3 itself from the kernel.

The leak detector 230-4 is generally responsible for detecting the quantity or count of resource leaks associated with a particular reference indicator. In an illustrative example, a process may receive a user request to close or shutdown the process and a kernel can send an ETW event back to the process, the leak detector 230-4, and/or log the event. The ETW event may indicate that the resource indicator is about to be removed. This event can be used by the leak detector 230-4 as a marker to know that anything freed after this point is a resource leak.

The insights component 222 is generally responsible for detecting performance issues and generates associated data, such as generating indications of such detections so as to cause presentation of the indications, as described in more detail herein. In some embodiments, the insights component detects performance issues based on what is in a policy file as read by the policy file component 202. In some embodiments, the insights component 222 generates a hash (a CRC signature) or other unique identifier for a performance issue and a set of related call stack frames, which is described in more detail below. In an example illustration, when a reference indicator count (as determined by the reference indicator creation detector 230-2) is over a threshold (as determined by the insights component 222), an indication can be made to a user interface there are an unusually high number of reference indicators that have been made, which may be a hint of a resource leak.

Example system 200 also includes storage 225. Storage 225 generally stores information including data, computer instructions (e.g., software program instructions, routines, or services), data structures, training data, and/or models used in embodiments of the technologies described herein. By way of example and not limitation, data included in storage 225, as well as any user data, may generally be referred to throughout as data. Storage 225 can include structured, semi-structured, or non-structured data.

Figure 3:
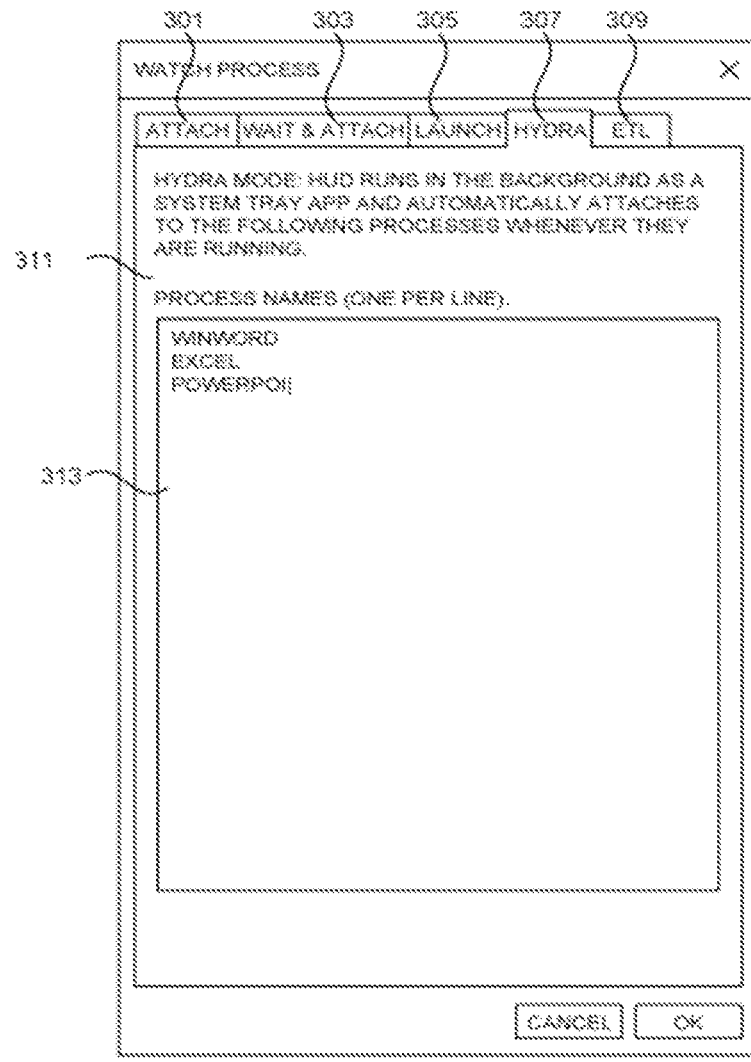
FIG. 3 is a screenshot of a user interface window illustrating how a performance tool can be launched, in accordance with some embodiments.

FIG. 3 is a screenshot 300 of a user interface window illustrating how a performance tool can be launched, according to some embodiments. In some embodiments, the launching component 204 of FIG. 2 generates the data and/or user interface of FIG. 3. In some embodiments, each screenshot described herein (e.g., FIGS. 3-13) is a part of a performance tool application stored on the user device 102*a*. Alternatively, in some embodiments, some or each screenshot described herein corresponds to a plugin, service, or web application (e.g., the server 106). In particular embodiments, before a process or application launches or starts, a user can configure how a performance tool, which analyses the process, runs. The attach element 301 allows a user to select an existing process from a list defined in the field 313 or manually find an existing process. The wait and attach element 303 allows a user to define a process that is not yet running but that which the user desires to be processed by the performance tool at some future time. And when the process is launched, the performance tool automatically attaches and begins functionality (e.g., detects performance issues) based on the process being defined in the element 303. The launch element 305 allows a user to choose an EXE (executable file) to launch and immediately attach the performance tool to upon the EXE being opened. The ETL element 309 corresponds to "Event Trace Log" functionality, which allows an operating system to record application and OS system-level warnings, errors, or other events or performance issues to a binary file.

The hydra element 307 allows users to define a list of processes for the performance tool to engage, which causes the performance tool functionality to auto-attach or auto-generate performance metrics when the processes are launched, referred to herein as "hydra mode." This is unlike typical existing technologies that only allow users to launch a profiler tool in response to a user manually opening a single application. Hydra mode thus improves existing profiling technologies by auto-attaching to potentially several different processes upon process launch. As illustrated in the field 311, the user has listed the processes corresponding to WORD, POWERPOINT, and EXCEL. In some embodiments, the hydra mode functionality tracks session history (e.g., a timestamp of begin and end time) of every defined process in the field 313 or via the command line. A session may begin or have a beginning time stamp when the application launches and the session may stop or have an end time stamp when the user closes or shuts down the application. In some embodiments, performance tool functionality automatically engages in the background (e.g., there is no user interface) in response to processes being defined via hydra mode. For example, performance is automatically tracked without regard to any user interface in response to the processes being defined. Alternatively, in some embodiments, performance tool functionality automatically engages and a user interface is shown, such as the screenshot 4A of FIG. 4. In this way, the performance tool is not intrusive whatsoever unless a user makes a selection to provide a user interface in particular embodiments.

Figure 4A:
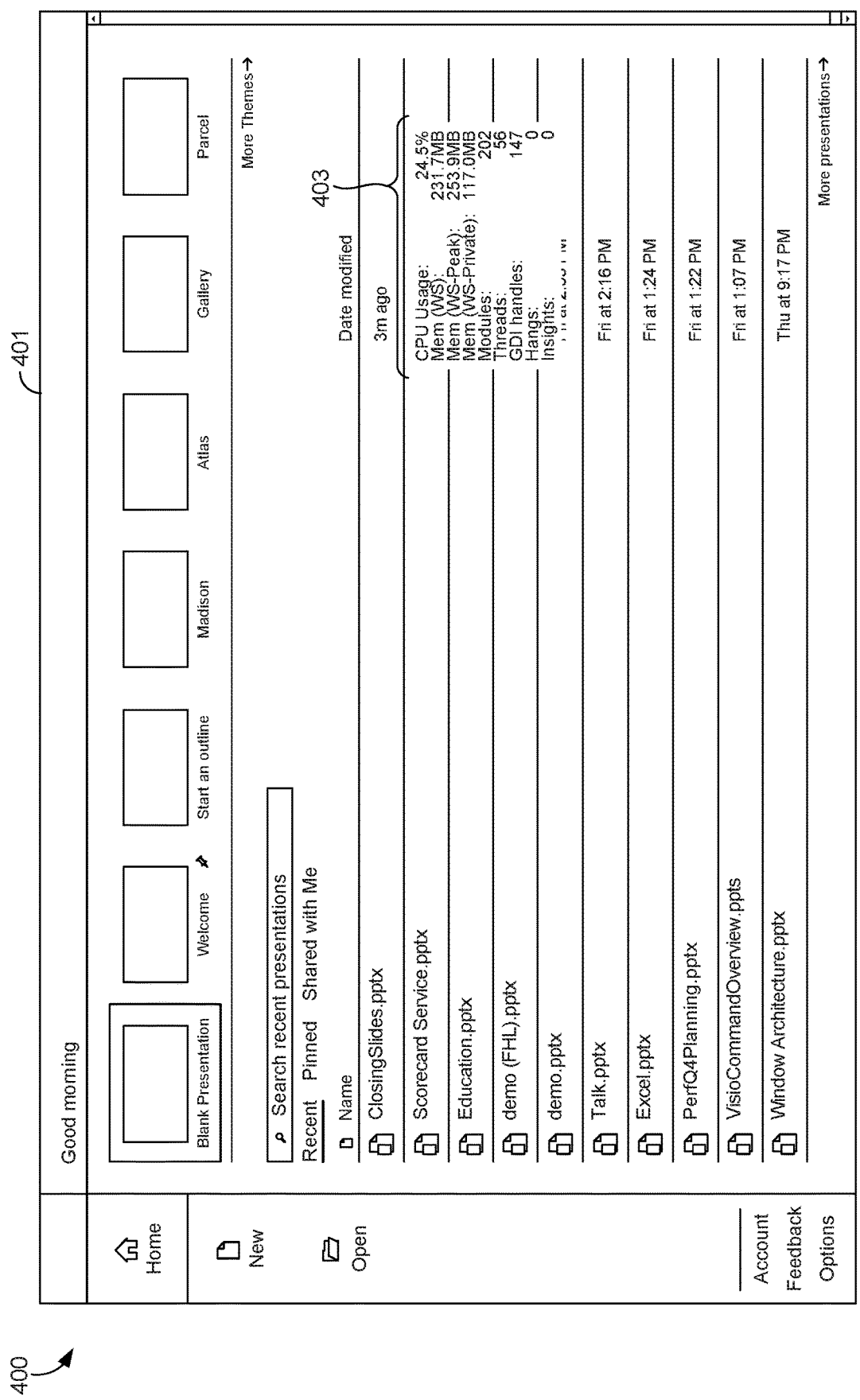
FIG. 4A is a screenshot that illustrates a transparent indicator window of performance metrics over an application, in accordance with some embodiments.
Figure 4B:
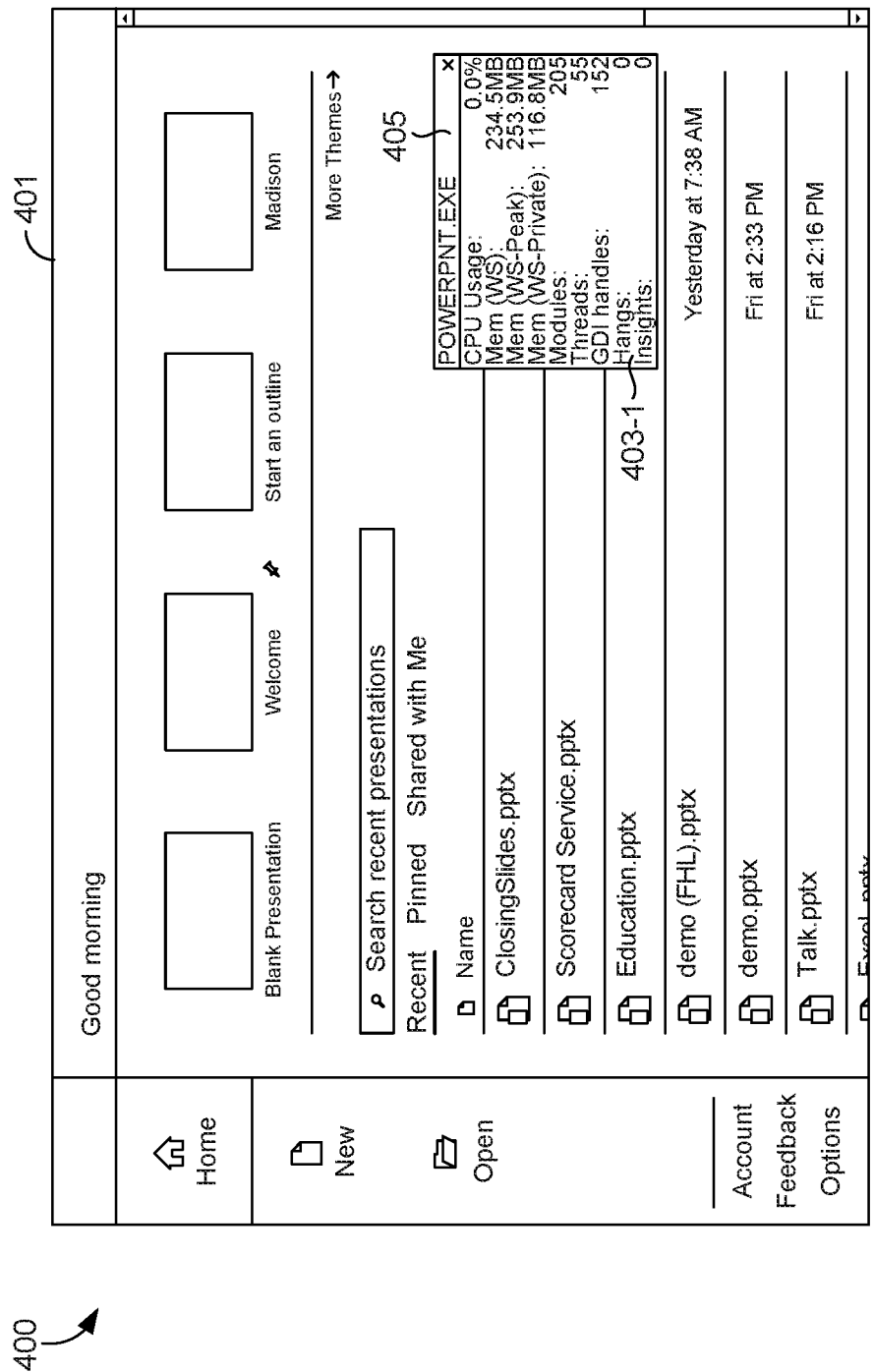
FIG. 4B is a screenshot illustrating a pronounced indicator window, in accordance with some embodiments.
Figure 4C:
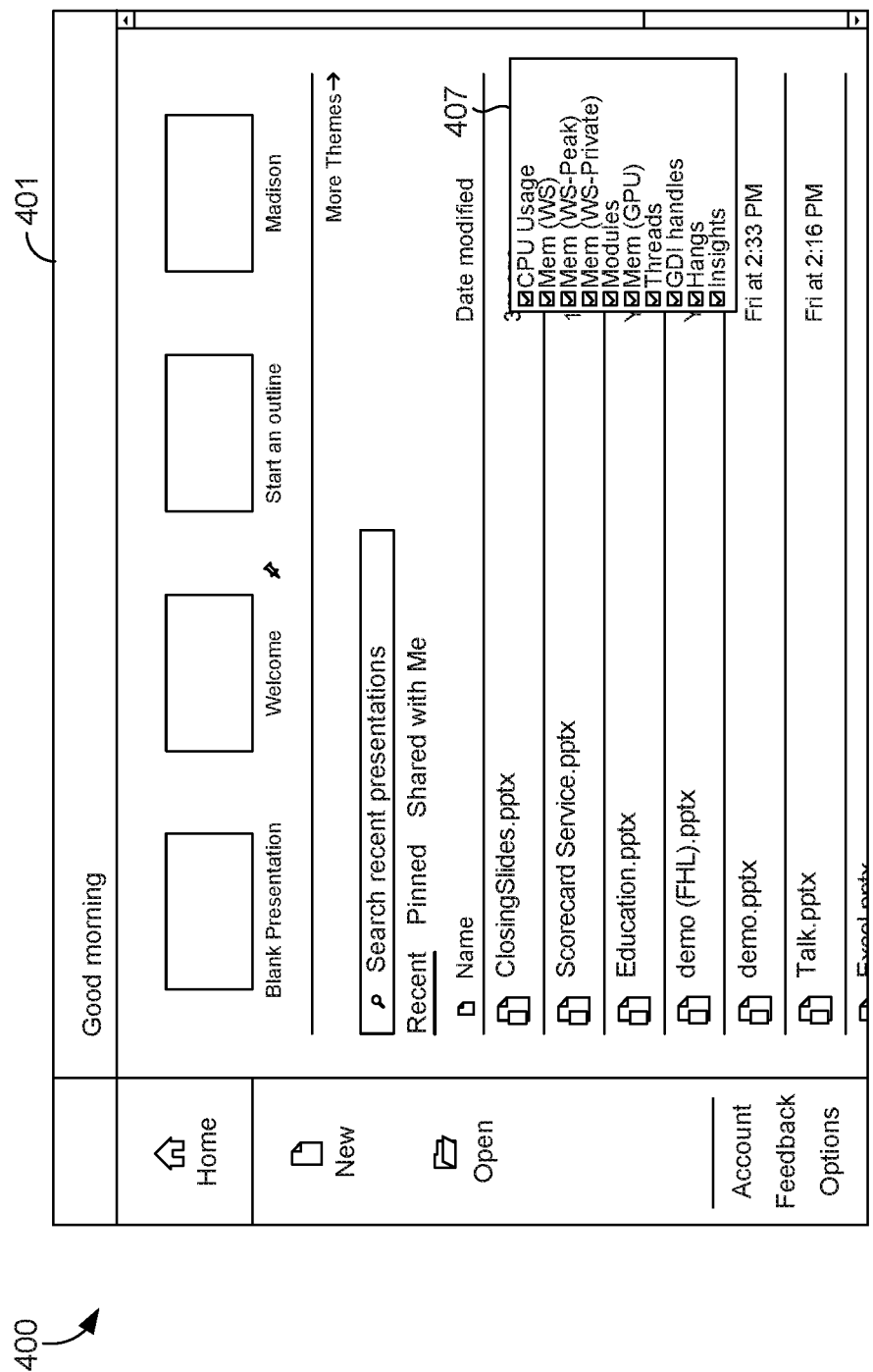
FIG. 4C is a screenshot illustrating that a user can select which resources or performance metrics the user wants the performance tool to track, in accordance with some embodiments.

FIGS. 4A-4C represent indicator window functionality that gives a brief performance summary in response to a process being launched, according to some embodiments. In some embodiments, the indicator UI component 206 generates the user interfaces and/or data of FIGS. 4A through 4E. FIG. 4A illustrates a transparent indicator window 403 of performance metrics over an application. In some embodiments, this functionality occurs subsequent to a user configuring the performance tool (e.g., via the launching component 204) and automatically in response to a user launching a process to be tested. For example, a user may configure the performance tool via the user interface indicated in FIG. 3. Subsequently, the user may launch or open a POWERPOINT application 401 and automatically the transparent window 403 is displayed (which is not embedded in the application 401 but sits on top of the application 401, as it is a different process). As illustrated, the transparent window 403 appears to not be a window at all but lists the resources and their performance metrics (e.g., hangs, threads). In this way, users are not distracted by it when they are testing or otherwise interfacing with the application 401.

FIG. 4B illustrates that the indicator window 403 becoming more pronounced or opaque (changing into window 403-1) in response to the pointer 405 hovering over or selecting the indicator window 403. In this way, the performance metrics become more pronounced. In some embodiments, when a performance issue is detected, the window 403 automatically and responsively changes to the window 403-1 or otherwise becomes pronounced so that there is a greater chance the user is aware of the performance issue. For example, the performance tool may detect a hang according to a policy. Responsively, the window 403 or 403-1 can explode twice its size or otherwise become larger so that it is more noticeable. Additionally or alternatively, the specific performance metric associated with the performance issue is highlighted (e.g., color coded) or otherwise prominently flagged. For example, the GDI handles and its value 138 may be color coded red if it is determined to be a performance issue.

In some embodiments, an indicator window (e.g., 403-1 and/or 403) is configured to be dragged to any location within an application such that anytime the application is dragged or moved, the indicator window maintains or "snaps back" to its position on the application. For example, referring to FIG. 4B, the user may drag, via the pointer 405, the indicator window 403-1 from the right side of the application 401 to the left side of the application 401. Subsequently, when a user moves the application 401 in any fashion, the indicator window 403-1 snaps to its position on the left side of the application 401 where the user originally dragged it.

FIG. 4C illustrates that a user can select which resources or performance metrics the user wants the performance tool to track. Thus, the dialog box 407 allows a user to select fields corresponding to CPU usage, different types of memory utilization, thread counts, GDI handles, hangs, and insights (i.e., quantity of performance issues detected) in order to provide the performance tool input resources to monitor and provide the user interface with metrics so that the user can view them. In some embodiments, the dialog box 407 is caused to be displayed in response to a right click or other selection of the indicator window 403-1. And when the user makes the selections in the dialog box, the change is automatically reflected in the indicator window 403-1.

Figure 5:
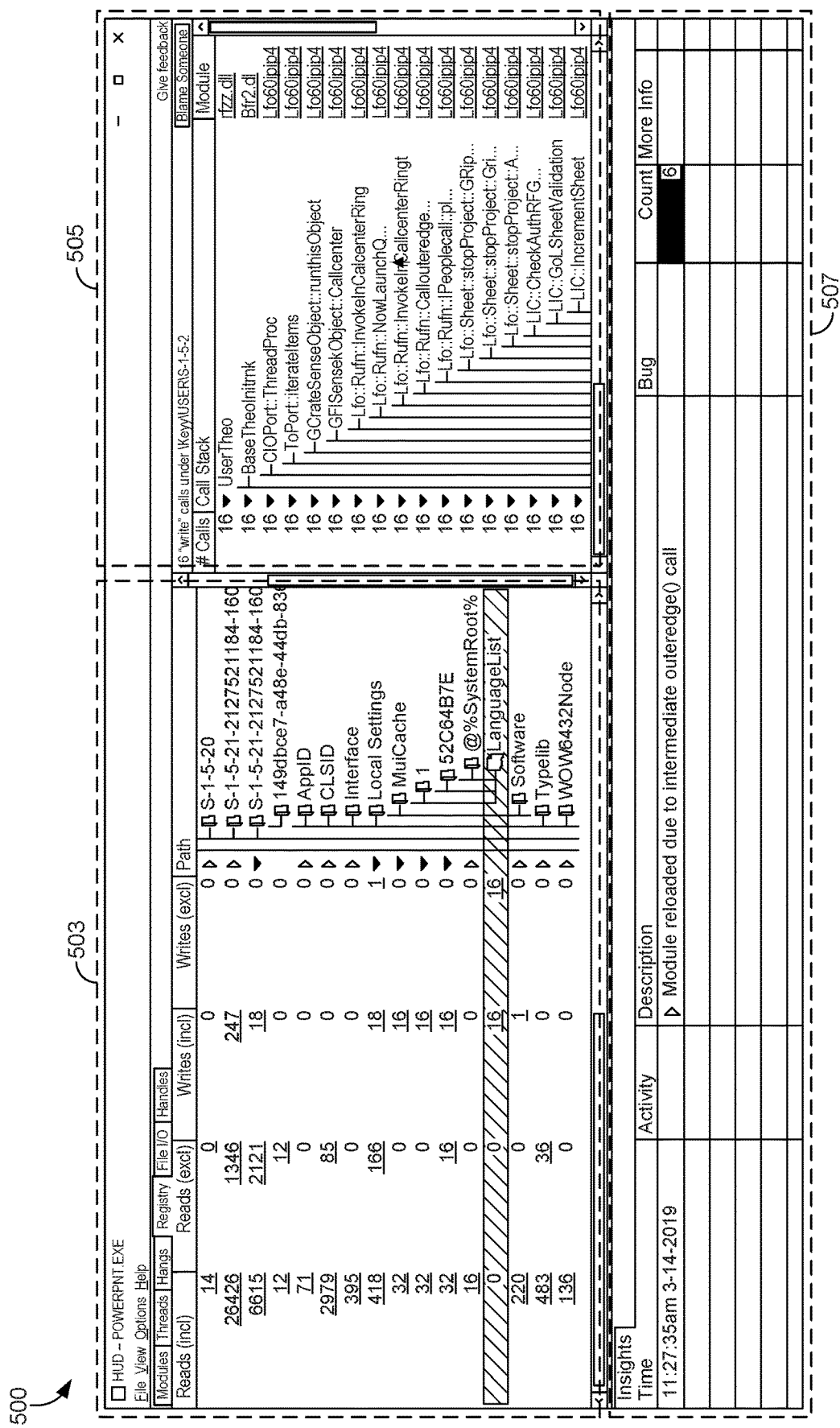
FIG. 5 is a screenshot of a user interface that illustrates the performance metrics, the call stacks of the particular performance metrics selected, and the performance issues that are detected, in accordance with some embodiments.

FIG. 5 is a screenshot 500 of a user interface that illustrates the performance metrics, the call stacks of the particular performance metrics selected, and the performance issues that are detected. In some embodiments, the full view UI component 212 generates the UI and/or determines the data within FIG. 5. In some embodiments, the screenshot 500 represents the "full view" as described herein, such that a user does not have to drill down various layers to see sets of information, which improves existing technology tools, where users would have to for example, drill down several layers of a user interface to see a call stack or different performance metrics. In some embodiments, the screenshot 500 is automatically provided for display in response to the user selecting any portion of the window 403-1 (or 403) of FIG. 4. In this way, the screenshot 500 allows the user to get a more detailed view of performance and any performance issues detected in a quick, readily available view.

Section 503 of FIG. 5 displays the resource identifier (e.g., tab, such as "modules," "threads," "hangs," "registry," "file I/O," and "handles") or Key Performance Indicators (KPI) that have been defined by a user for the performance tool to analyze. A selection of any of the resource identifiers cause more detailed information or metrics to be displayed in the section 503 for the selected resource identifier, which is described in more detail herein. In some embodiments, these resource identifiers are caused to be displayed based on what metric the user selected in the window 407 of FIG. 4. As described above, these resource identifiers or tabs are oriented in an intuitive way, which means that the user can easily and quickly analyze different performance metrics, which improves existing technology user interfaces, which require tedious navigation and drilling. In some embodiments, the resource identifiers and associated functionality are extensible, such that an extension or plugin can be generated for the particular performance or resource needed to be monitored according to the specific application. For example, a plugin can be generated and added to the section 503 called "GPU," (e.g., another tab), which allows GPU utilization to be monitored.

Section 505 of FIG. 5 displays a call stack associated with the resource identifier selected in the section 503. For example, as illustrated in FIG. 5, a user has selected a record in the section 503 where there has been 16 writes. In response to this selection, the section 505 can display each of the calls (16) or writes made. The insights section 507 displays performance issues or insights that the performance issue tool has detected. In some embodiments, user define policies, such as resource budgets, which when violated, will cause the performance issue and associated metadata to be displayed, as indicated in the section 507. The section 505 is described in more detail herein.

Figure 6:
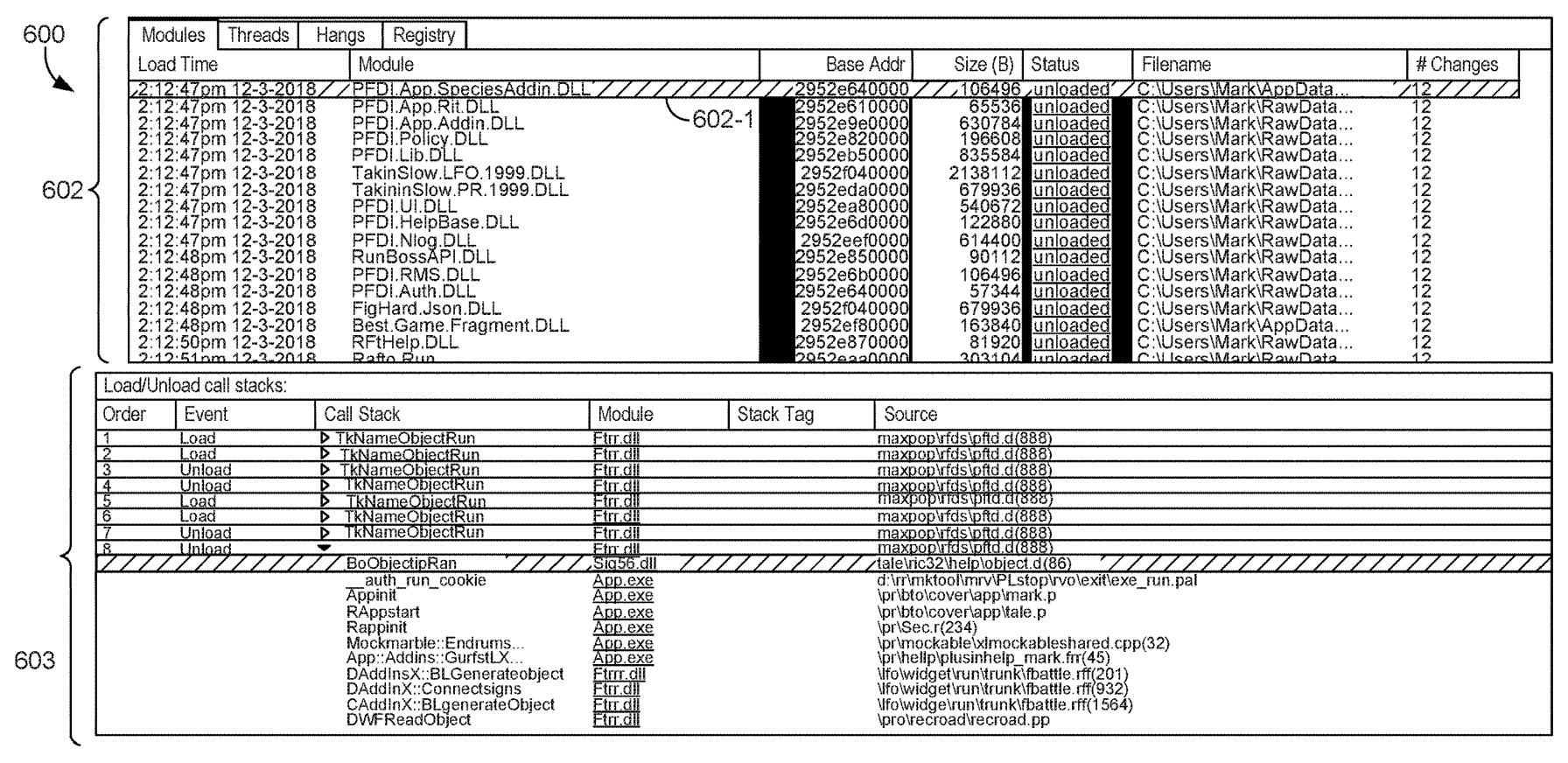

FIG. 6 is a screenshot 600 of a user interface illustrating a history of Dynamic-Link Libraries (DLL) activity and attributes them to a corresponding call stack. In some embodiments, the DLL component 216 generates the user interface and/or determines the data in FIG. 6. In some embodiments, the screenshot 600 is displayed in response to a selection of the "modules" tab, as illustrated in the section 503 of FIG. 5. A DLL is a library that contains code and data that can be used by more than one program at the same time. For example, in WINDOWS OS, the Comdlg32 DLL performs shared dialog box related functions. Each program can use the functionality that is contained in this DLL to implement an open dialog box. This promotes modularization or separation of code into components, code reuse, efficient memory usage, and reduced disk space.

FIG. 6 illustrates a historical list of DLLs that have been loaded and unloaded. Each record in the section 602 corresponds to an individual module or component. In some instances, performance issues may arise when a DLL was loaded when it should not have been loaded and vice versa or is associated with too many loads or unloads. For example, a first module may load at a first time, unload (e.g., via a free library) at a second time subsequent to the first time, and then load again subsequent to the second time, which is indicative of a performance issue because the second time load caused the DLL to run its initialization logic again. The first initialization was necessary, and so was the second initialization, but the redundancy caused extra time, memory, energy, and the like.

There are various attributes indicated in the section 602. The "load time" attribute functionality determines the timestamp at which the particular module was loaded or unloaded. The "module" attribute functionality determines the particular code module or component that was loaded or unloaded. The "base address" attribute functionality determines the virtual memory address of the DLL. The "status" attribute functionality indicates whether the DLL is loaded or unloaded, such as whether the DLL has changed from not loaded to loaded. The "size (b)" attribute functionality indicates the size of the module in bytes. The "filename" attribute functionality identifies the file path or directory tree of the module. The "#changes" attribute functionality corresponds to organizing the records within the section 602 based on the number of load or unloads for a particular module or set of modules.

In various embodiments, in response to a selection of a record (e.g., 602-1) within the section 602, the corresponding call stack (a load or unload call stack) is caused to be displayed in the section 603, showing each active function activity of the module. In some embodiments, the section 603 corresponds to the section 505 of FIG. 5. In this way, users can find the call stack instance (e.g., call stack frame) that is responsible for the DLL being accidentally loaded or unloaded. Per the section 603, the "order" attribute functionality determines the order that load or unload events were loaded or unloaded. The "event" attribute indicates the specific load or unload event. The "call stack" attribute functionality identifies the call stack of the load or unload event selected in the section 602-1. The "module" attribute indicates whether the particular module loaded or unloaded. The "stack tag" indicates the stack frame or stack column of the particular event selected in the section 603.

Figure 7:
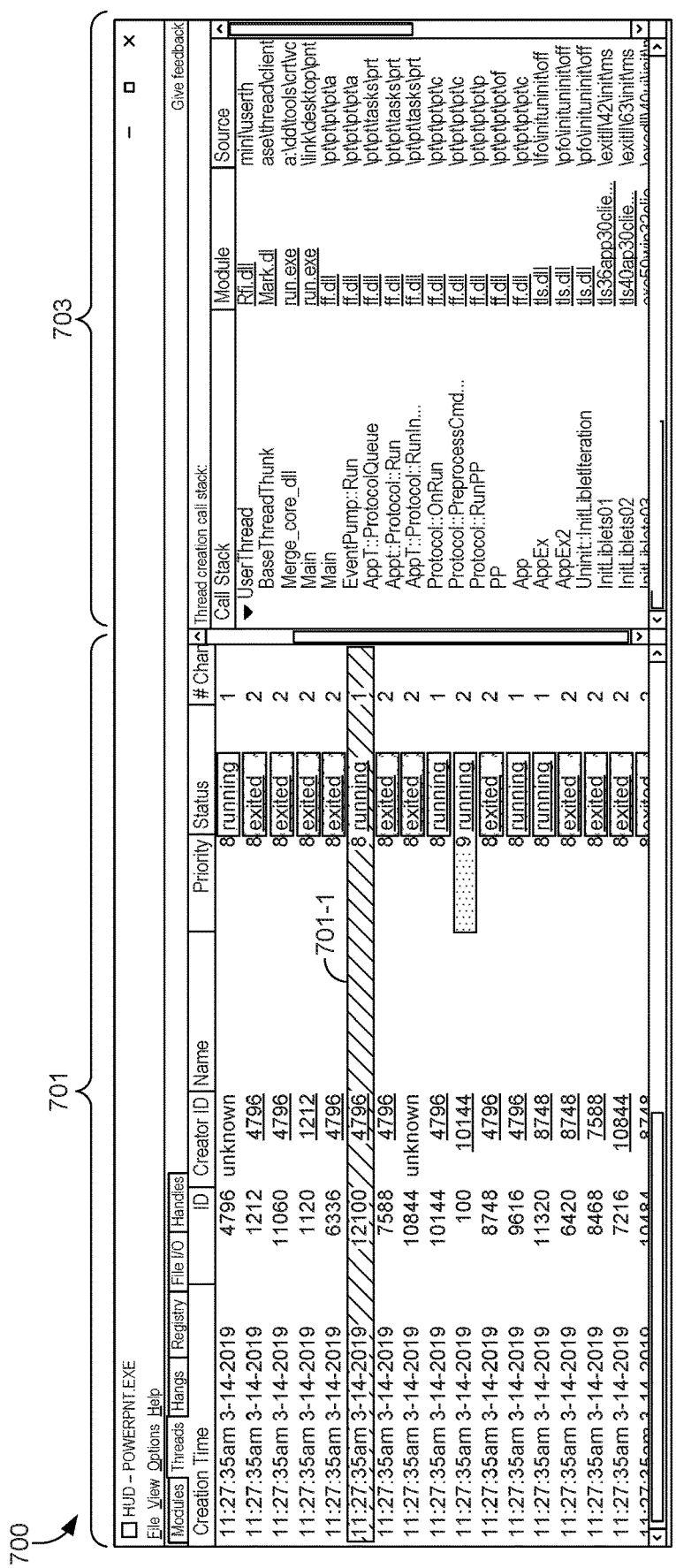
FIG. 7 is a screenshot of a user interface illustrating a history of threads created and exited during a performance tool session, in accordance with some embodiments.

FIG. 7 is a screenshot 700 of a user interface illustrating a history of threads created an exited during a performance tool session, according to some embodiments. In some embodiments, the thread component 208 generates the user interface and/or determines the data in the user interface of FIG. 7. In some embodiments, the screenshot 700 is displayed in response to a selection of the "threads" tab in the section 503 of FIG. 5. A "thread" is the smallest unit of processing and is made up of one or more processes. An individual thread can: contain a program counter that contains an address of the next instruction to be executed, have its own call stack, have a set of registers, and a unique ID. Threads typically do not run on their own but run within a process or application.

Section 701 of FIG. 7 includes various attributes associated with threads. Each record corresponds to an individual thread and attribute information for that thread. For example, the "creation time" attribute corresponds to functionality that generates a timestamp for when a thread was created. The "ID" attribute corresponds to a thread ID genus. The "creator ID" attribute is indicative of a thread ID species of the genus. In some embodiments, in response to a selection of the "creator ID" element, the creator IDs are organized by their ID so that a user can see the quantity of specific threads generated. The "priority" attribute functionality determines a particular priority for running or executing. For example, priority can be represented by a number between 1 and 10, where the highest priority thread is 10 and the lowest priority is 1. Priority helps a thread scheduler determine the order in which threads are scheduled. Threads with higher priority or numbers typically run before and more frequently than lower priority and number threads. The "status" attribute functionality indicates whether a particular thread is currently "running" or has "exited" or stopped. The "#change" attribute functionality corresponds to a quantity of changes that a thread has undergone in terms of running and exiting, which is indicative of the quantity of times a thread has run and exited.

In some embodiments, in response to a selection of a record within the section 701, the call stack section 703 is displayed. For example, as illustrated in FIG. 7, when the record 701-1 is selected, the thread creation call stack is generated as indicated in the section 703. Accordingly, a user can see exactly where in the call stack the particular thread is running or exiting. The "module" attribute functionality corresponds to indicating what particular module the particular thread is a part of. The "source" attribute functionality corresponds to the particular process or application that the module belongs to.

Figure 8A:
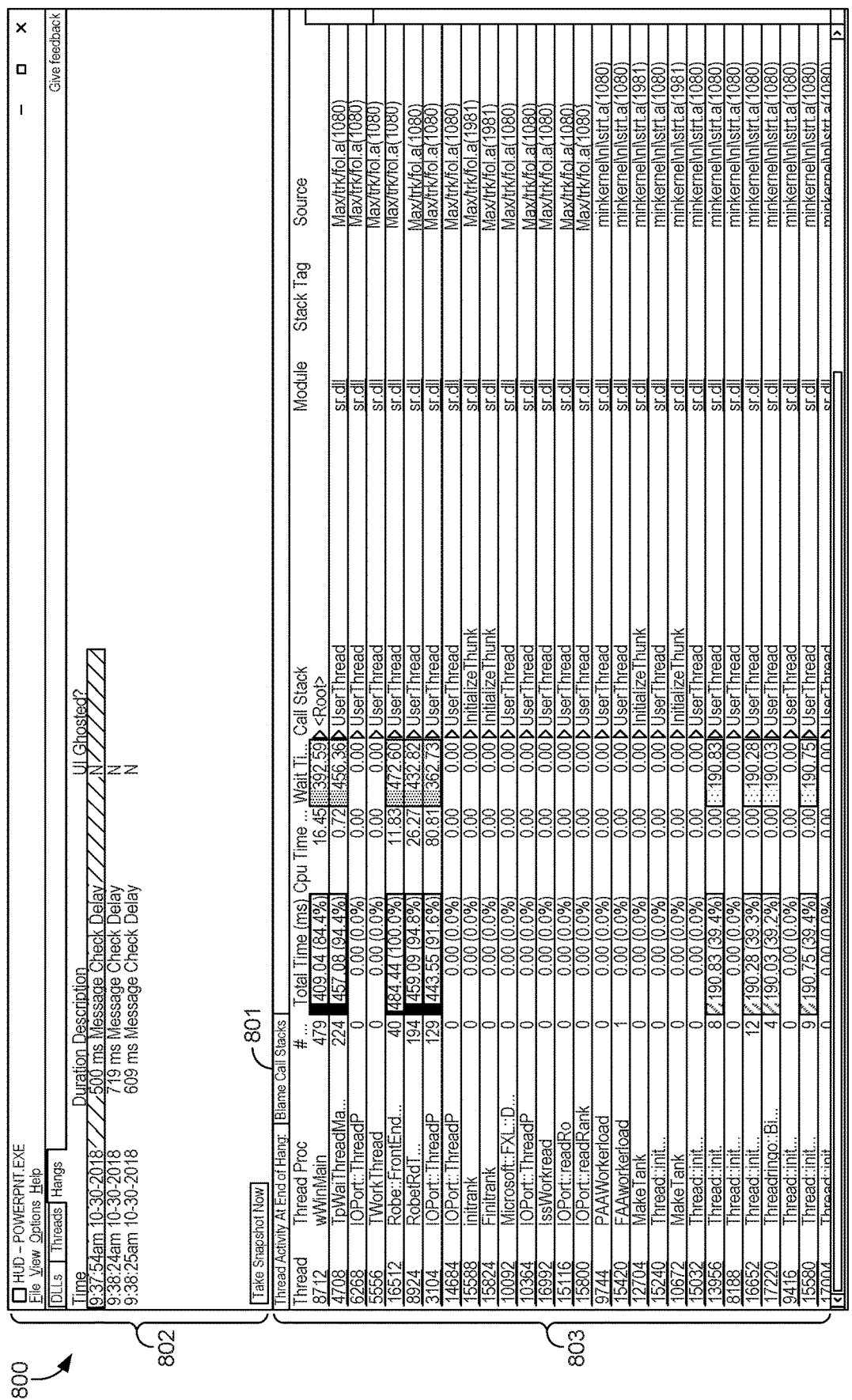
FIG. 8A is a screenshot of a user interface illustrating hang events and where they are occurring, in accordance with some embodiments.

FIG. 8A is a screenshot 800 of a user interface illustrating hang events and where they are occurring, according to some embodiments. In some embodiments, the hangs component 214 generates the user interface or determines the data in the user interface of FIG. 8. In some embodiments, the screenshot 800 is displayed in response to a selection of the "hangs" tab in the section 503 of FIG. 5. In various embodiments, each performance issue hang is illustrated in the section 802. Within the section 802, the "time" attribute functionality corresponds to a time stamp at which the hang performance issue was detected. The "duration description" attribute corresponds to functionality that describes the specific hand duration (e.g., "500 MS Message check Delay") indicating that a message was not checked fast enough according to a policy (e.g., within 200 MS). The "UI ghosted" attribute functionality corresponds to an OS-level concept where the OS will create a "ghost" window over the top of an unresponsive window that has a dimmed/frosted appearance with a responsive X (close) button so the user can forcefully close the underlying application. In this way, the user is always in control regardless of the application logic.

In some embodiments, in response to a selection of one of the records within the section 802, the data corresponding to the section 803 is displayed. Each record in the section 803 corresponds to a particular thread and associated hang attribute information. Accordingly, call stacks of different threads are merged to a single view (i.e., the section 803) so that it can be determined where, among various call stacks, one or more hangs were detected. As described earlier, in some instances there is a single call stack per thread. The "thread" attribution functionality indicates the specific Thread ID of the thread. The "thread proc" attribute functionality corresponds to an indication of where the starting address for a thread is. "Thread proc" corresponds to an application-defined function that serves as the starting address for a thread.

"Total time" attribute functionality (e.g., total hang time) automatically (without user intervention) determines what threads were active or processing during a hang, and indicates (without user intervention) this via color-coded functionality that serves as a "heat map" or different shades of one or more colors where the particular shade corresponds to the particular hang time (e.g., the "total time"). It is understood that color-coding is one example of ways to identifying the call stacks that are active or with the most hang time. Alternatively or additionally, in some embodiments, there may be other displayed functionality that indicates the records (threads, stacks) that are active or associated with the most hang time over a threshold. For example, this can be indicated via flags, pop-up windows, audible sounds and the like. This improves existing technology, as existing tools require users to manually identify performance hangs and other performance issues, which is described in more detail herein.

In various embodiments, the "total time" is determined by adding the "CPU time" and the "wait time." In some embodiments, the "CPU time" corresponds to the total range of time (e.g., in MS) the CPU is actually executing during thread or process execution and during the hang. In some embodiments, the "wait time" corresponds to the range of idle time (e.g., in MS) that the CPU is not executing during thread or process execution and during a hang. Typically, when threads or processes are executed, the CPU sits idle for at least a portion of time while data is fetch from I/O devices, such as a keyboard or waiting for the mechanical movements of the read/write head to find the correct sector and track on a disk. Accordingly, thread or process execution can be broken up into actual CPU utilization time and wait time. Therefore, combining the CPU time and the wait time gives an indication of the overall latency time. Accordingly, in some embodiments, the "wait time" is also color coded or otherwise marked in the user interface, which in some cases corresponds to the boundaries or hash of a performance identifier or set of stacks, as described in more detail herein. For example, as illustrated in the element 803 of FIG. 8A, the wait time call stacks are color coded darker relative to the other active threads representing the "total time."

Figure 8B:
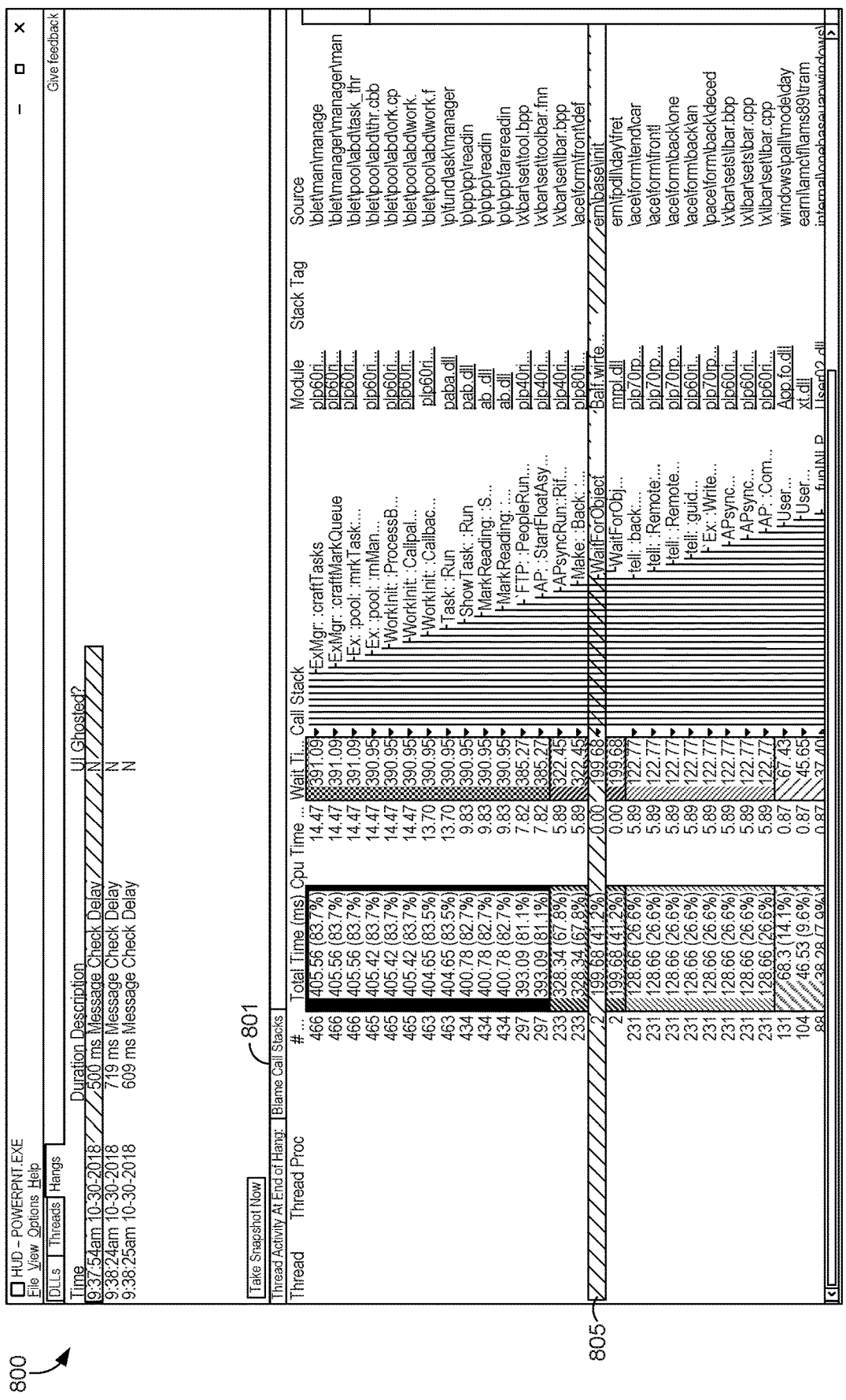
FIG. 8B is a screenshot of a user interface illustrating the hottest path or thread and corresponding call stack that has the greatest amount (or threshold amount) of hang time relative to other threads and/or call stacks of a process, in accordance with some embodiments.

The "call stack" attribute functionality indicates the call stack that belongs to the particular thread. The "module" attribution functionality indicates the module or component that the thread and call stack belong to. The "stack tag" attribute functionality indicates the stack frames for which the blame occurred, which is displayed, for example, when the "blame call stacks" element 801 is selected. In particular embodiments, in response to a selection of the "blame call stacks" element 801, FIG. 8B is displayed and indicates the "hottest path" or thread and corresponding call stack that has the greatest amount (or threshold amount) of hang time (e.g., total time and/or wait time) relative to other threads and/or call stacks of a process. Specifically, the call stack tags or frames are indicated as well as the specific call stack elements, such as functions, and their corresponding total time, CPU time, and wait time. For example, the record 805 indicates that the wait for the "single object" instance is waiting 322.45 MS for an animation instance associated with the record 807 to finish transitioning.

Figure 8C:
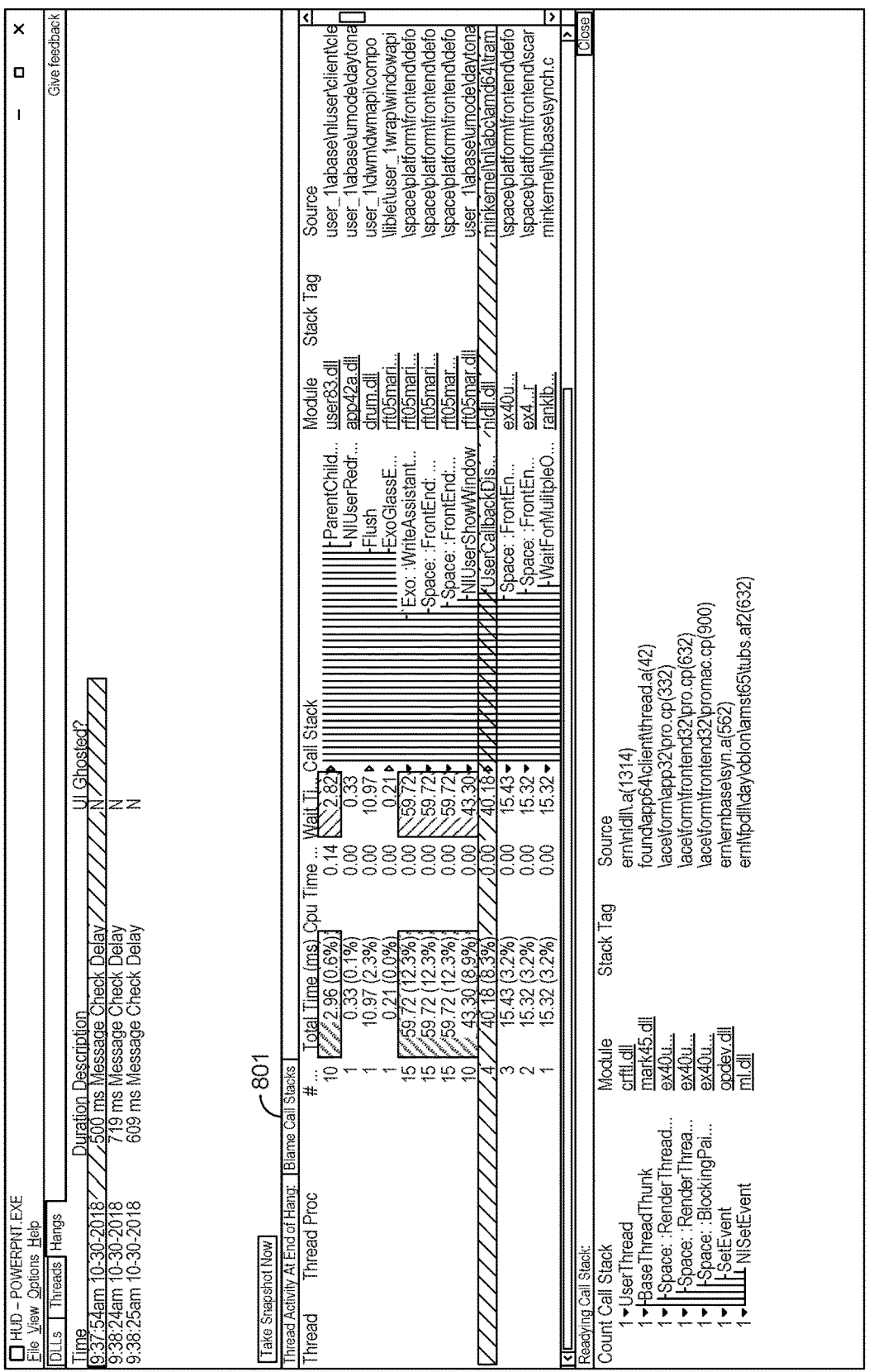
FIG. 8C is a screenshot of a user interface indicating what threads are blocking other threads during one or more hangs, in accordance with some embodiments.

FIG. 8C is a screenshot of a user interface indicating what threads are blocking other threads during one or more hangs, according to some embodiments. A thread is blocked when its execution is paused. Some threads block other threads because they need to finish processing or cannot be processed when other threads are processed first. In some embodiments, these threads are "readying threads." A "readying thread" is a thread that "readies" or unblocks another thread. In particular embodiments, the performance tool provides the readying thread so that a user can see what background work was blocking the thread where the hang was detected. For example, FIG. 8C illustrates one call to a render thread, and the "set event" thread unblocked the main thread to continue. Accordingly, users can see threads working together. In this way, these embodiments improve existing technology because users do not have to manually generate logging files (e.g., ETL file), which can be very disruptive to developer workflows. Logging files generate logs using the events from OS kernels. Instead, this functionality is provided via FIG. 8C, which allows a user to efficiently run a process, quickly identify the blocking threads, and fix or report the performance issue.

Figure 9:
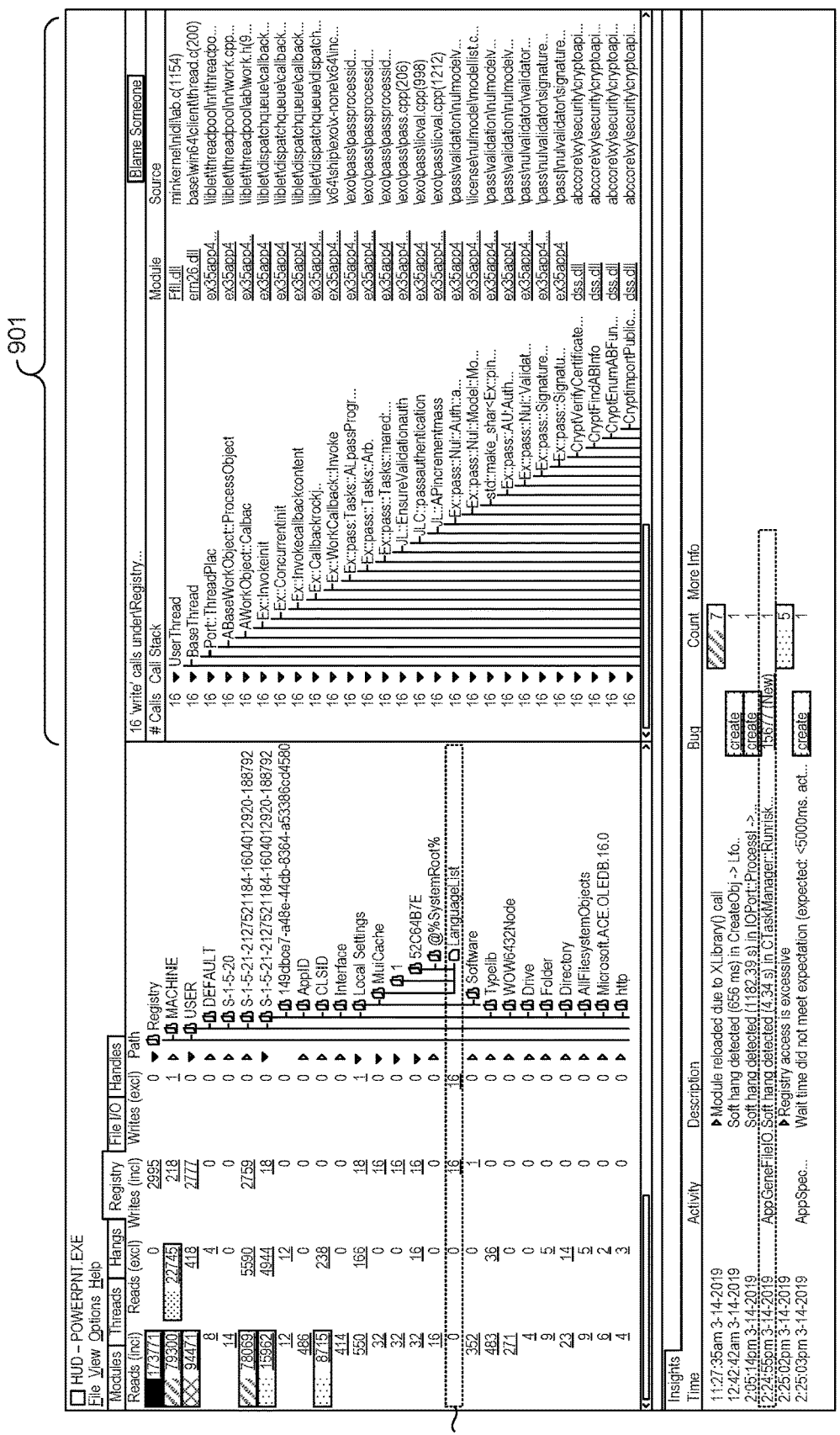
FIG. 9 illustrates a screenshot indicating various information associated with reads and/or writes of a process to a registry, in accordance with some embodiments.

FIG. 9 illustrates a screenshot 900 indicating various information associated with reads and/or writes of a process to a registry. In some embodiments, the registry component 220 provides the user interface or determines the data within the user interface of FIG. 9. In some embodiments, the screenshot 900 is displayed in response to a selection of the "registry" tab in the section 503 of FIG. 5. A "registry" is a database that stores information, settings, options, and/or other values of a MICROSOFT WINDOWS operating system, which can be configurable.

However, the functionality and screenshot 900 need not be specific to registries or particular operating systems. Rather, in various embodiments, the associated functionality provides various read or write information of any suitable data store associated with settings, options, or other values of any operating system. Accordingly, in various embodiments, "registry" can simply be swapped out with another operating system configuration database. In some embodiments, the screenshot 900 is displayed in response to a selection of the "registry" resource identifier in the element 503 of FIG. 5.

The "reads" attribute functionality corresponds to how many read I/O operations were made to the registry. In various instances, there are one or more reads to the registry when a process is launched. The "writes" attribute functionality is indicative of how may writes there were made to the registry. In various instances, there are one or more writes when a user inputs data into the process. In some embodiments, a summary graphical user interface element, such as the indicator window 403, can indicate the total amount of I/O operations made to the registry (i.e., total quantity of reads and writes). The "path" attribute functionality corresponds to the specific registry keys, directories, and/or registry key paths (where each registry key is nested under the immediate left registry key) and the specific quantity of reads or writes made for the specific registry keys, directories, and/or paths. Section 901 indicates the call stacks of the particular registry key selected. For example, when a user selects the registry 903, section 901 may be displayed. In some embodiments, a selection (e.g., the right arrow key on a keyboard) can be made to open a registry key and walk down its folder structure such that each selection opens up a registry key and sub-registry key to view exactly where each read and/or write occur. In various embodiments, the performance tool tracks exclusive (excl) and inclusive (incl) writes and writes. An "exclusive" write or read as it relates to the screenshot 900 is a read and/or write only done on that key or value. An "inclusive" read or write as it relates to the screenshot 900 is a read and/or write done within a key's hierarchy (e.g., within any child keys of a key).

Figure 10:
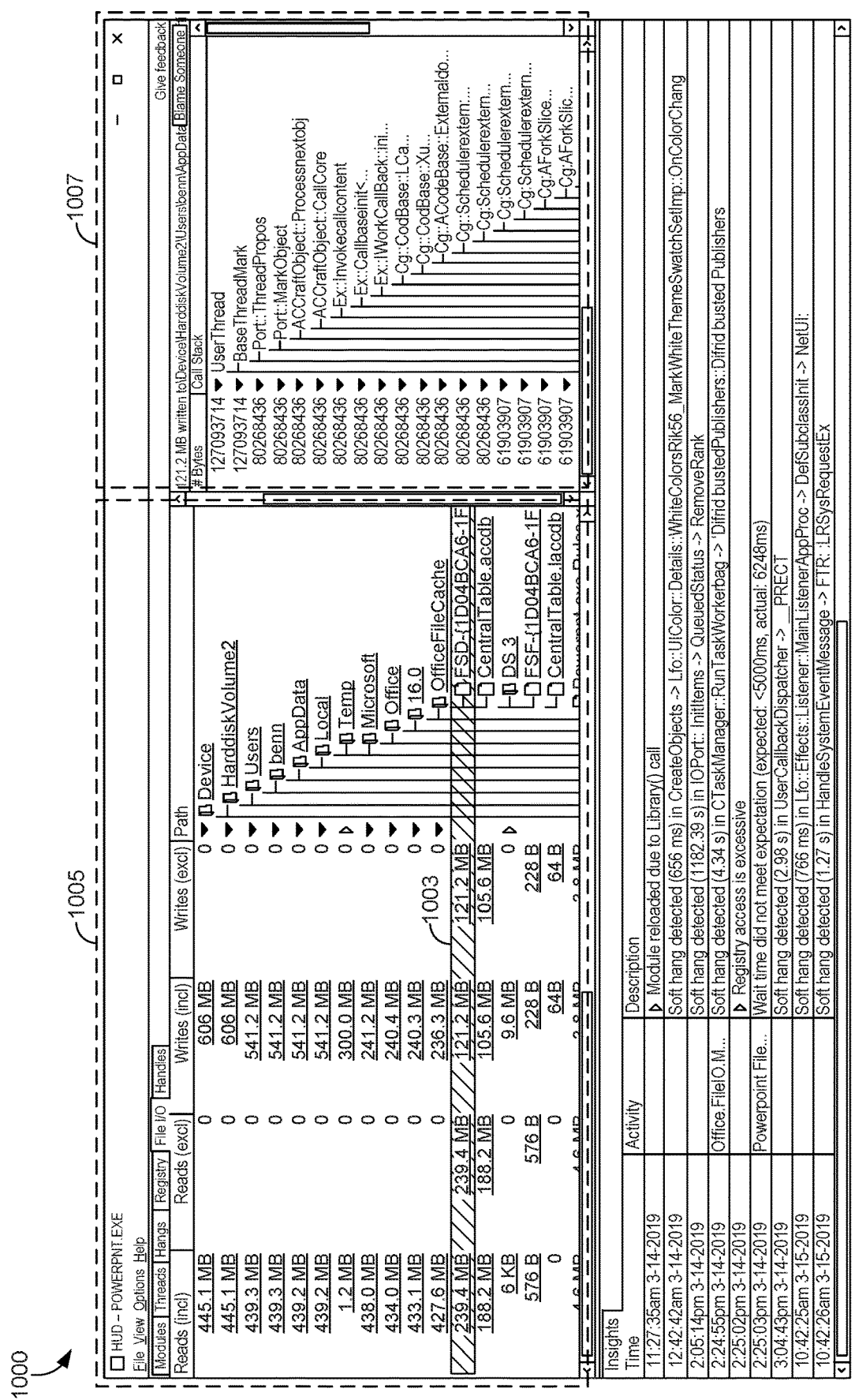
FIG. 10 is a screenshot of an example user interface that allows users to explore file access, in accordance with particular embodiments.

FIG. 10 is a screenshot 1000 of an example user interface that allows users to explore file access, according to particular embodiments. In some embodiments, the file I/O component 218 of FIG. 2 generates the user interface and/or determines that data within the user interface of FIG. 10. In some embodiments, the screenshot 100 is displayed in response to a selection of the "file I/O" resource indicator within the section 503 of FIG. 5. The resource/KPI section for file I/O is arranged in a folder view. The "read (incl)" attribute functionality indicates the quantity of bytes that are inclusively read from a particular directory or folder. An "inclusive read" as it relates to FIG. 10 is the quantity of bytes that are read from a particular directory and the directory's children or sub-folders or family in a hierarchy. The "read (excl)" attribute functionality indicates the quantity of bytes that are exclusively read from a particular directory or folder. An "exclusive read" as it relates to FIG. 10 is the quantity of bytes that are read from a particular directory without regard to the directory's children. The "write (incl)" attribute functionality indicates the quantity of bytes that are inclusively written to a particular directory or folder. An "inclusive write" in this context is the quantity of bytes written to a particular directory and the directory's children or family members in a hierarchy. The "write (excl)" attribute functionality corresponds to determining the bytes that occurred only to a particular directory without regard to the directory's children or other family members. The "path" attribute functionality provides the directories in a hierarchical view (showing directory children) within the section 1005 under the "path" attribute column. In some embodiments, in response to a selection of a record (e.g., the record 1003), another selection can be made (e.g., a right arrow key) to unwind the directory's hierarchy to walk down the folder hierarchy. For example, in response to a first selection, a first child's directory can be displayed under the parent directory. And in response to a second selection, a second child's directory can be displayed under the first child's directory and so on.

In some embodiments, in response to a selection of a record within the section 1005, such as the record 1003, the associated call stack is displayed in the section 1007. For example, in response to a selection of the record 1003, the system will merge call stacks that have read or written (exclusive and inclusive) to the FSD directory and the section 1007 will display all call stack fragments or frames that have performed the particular reads or writes indicated in the record 1003. In some embodiments, the directories indicated in the section 1005 under the "path" column are hyperlinks such that in response to a selection of the hyperlink, the file location is opened and a user can then open the file. For example, in response to a selection of the "device" directory, a view of the device directory can be displayed such that a selection of the directory causes the directory to be opened.

Figure 11:
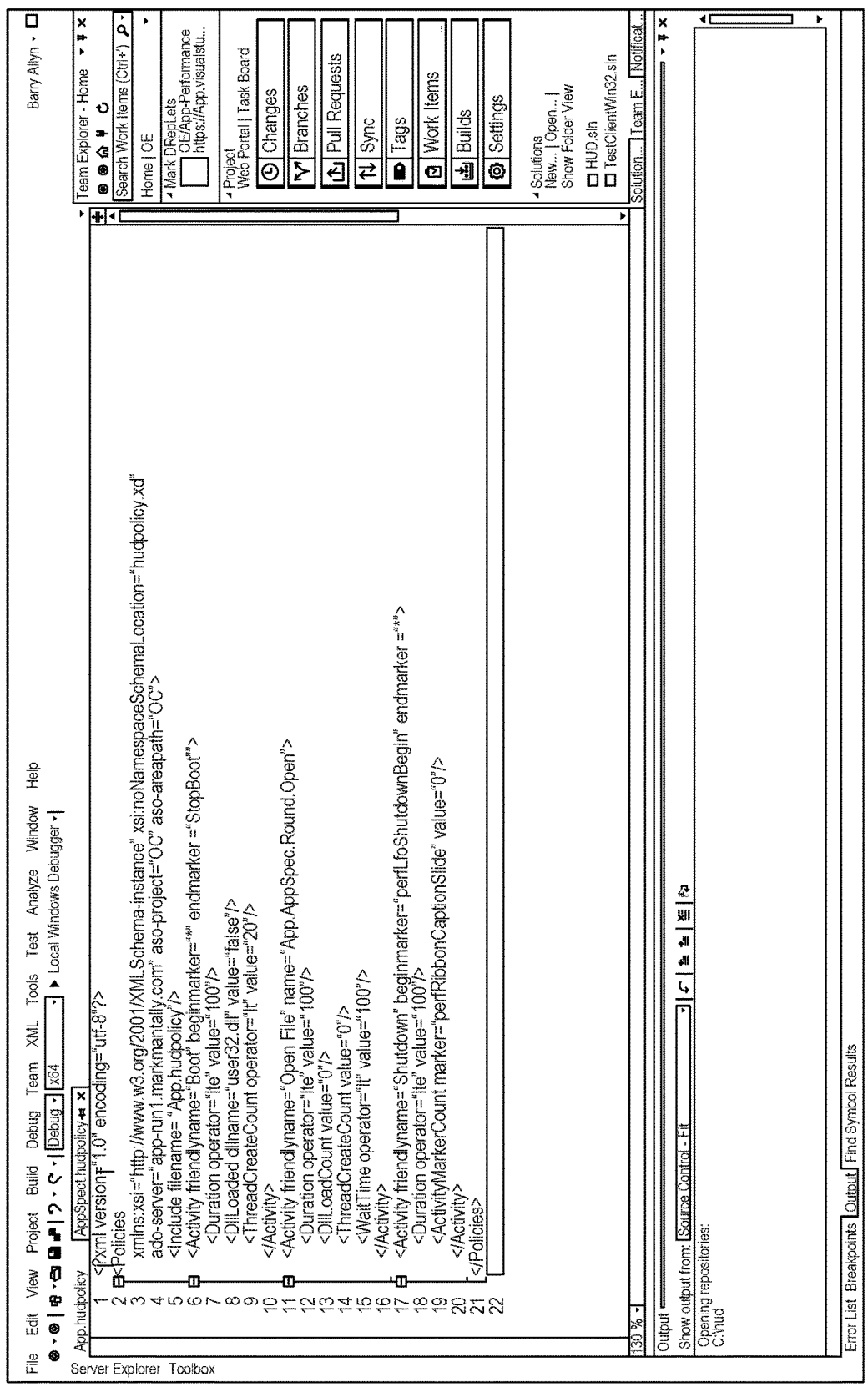
FIG. 11 is a screenshot of a policy file that is used to detect performance issues, in accordance with some embodiments.

FIG. 11 is a screenshot 1100 of a policy file that is used to detect performance issues, according to some embodiments. In some embodiments, the policy file component 202 generates data associated with FIG. 11. In some embodiments, the performance issues displayed in the element 507 of FIG. 5 occurs in response to a user defining one or more policies in the policy file analogous to FIG. 11 and the system detecting such performance issues. A policy file indicates several activities that occur for a given process. For example, on lines 6, 11, and 17, the policy file indicates that there is a "boot" activity, an "open file" activity and a "shutdown" activity for a POWERPOINT process. In some embodiments, each activity is defined by a "begin" and "end" code marker. A "begin" code marker indicates the instance of code where an activity begins within a process and the "end" code marker indicates the instance of code where an activity ends within a process. For example, in FIG. 11, line 6, the "begin" code marker indicates that "*" is the beginning piece of code for the boot activity and the "end" code marker indicates that "StopBoot" is the end code marker for the boot activity. In some embodiments, activities are alternatively or additionally defined by a name of an activity that automatically defines boundaries of the activity. For example, in FIG. 11, in lines 11 and 12, the name of the "open file" activity corresponds to "App.AppSpec.Round.Open"

Within each activity a user can declare one or more policies that drive performance issue detection. For example, line 7 of FIG. 11 illustrates that the "boot" activity should have a duration less than or equal to 100 milliseconds. Accordingly, in response to a user requesting to open a process, if the boot activity is greater than 100 milliseconds, a performance issue is detected and displayed, such as displaying a performance insight into the element 507 of FIG. 5 as an individual record. In another example, line 8 of FIG. 11 indicates that the load budget (loaded/not loaded) for a given DLL ("user32.dll") within the boot activity should not be loaded (i.e., "value="false"). In yet another example, line 9 indicates that the thread count policy for the boot activity should not exceed 20. Accordingly, if the thread count exceeds 20, then the thread count becomes a performance issue.

In some embodiments, the policy file is used to route a bug or performance issue to a particular user or team of users. For example, a server address or path can be defined in the policy file such that the system automatically routes the bug or performance issue to the correct user in response to a bug being generated or the performance issue being detected so as to attribute performance issues or bugs with users that created the code for which the performance issue or bug was reported. For example, in response to a bug being logged, the system can contact the associated server, which then causes notifications to be displayed to user devices indicating that the particular bug has been detected. Accordingly, the user of the user devices can then responsively fix or patch the bug. Line 4 of FIG. 11 indicates the particular server and path that the bug or performance issue is routed to—"server"+"markmantally.com aso-project=oc aso-areapath="OC"," which occurs for all activity performance issues or bugs detected. Alternatively, in some embodiments, attribution can be made on a per-activity basis. This is because in some instances different teams or users develop or are otherwise responsible for different activities. Accordingly, for example, there may be a unique server or path for the "boot" activity, a different server or path for the "open file" activity, and yet a different server or path for the "shutdown" activity based on each of these activities being created by different teams or users.

In some embodiments, in response to the performance tool auto-attaching to a process, the performance tool queries a policy file, such as the one indicated in FIG. 11 to determine what the performance issues are. Responsively, in some embodiments, the performance tool functionality (e.g., the window 403) can begin.

FIG. 12 is a screenshot 1200 of a user interface indicating performance issues detected and bug generation functionality, according to some embodiments. In some embodiments, the insights component 222 generates the user interface and/or the data within the user interface of FIGS. 12A through 12D. In some embodiments, the screenshot 1200 represents the section 507 of FIG. 5. In some embodiments, after a user defines a set of policies for resources and server/path routing (e.g., as described with respect to FIG. 11), the policy issues are detected and caused to be displayed in the screenshot 1200.

The "time" attribute functionality generates the timestamp at which a performance issue is detected. Each record within the screenshot 1200 corresponds to a specific performance issue detected. The "Activity" attribute functionality indicates that activity that the performance issue belongs to, or more specifically, in what activity was the policy defined in a policy file that was violated. The "description" attribute functionality generates a short description of the performance issue detected. The "bug" attribute functionality indicates whether a bug has been created or logged by a user for the performance issue detected or whether the bug has not been created or logged by a user for the performance issue detected. The "create" identifier indicates that a bug has not been created or logged before. The "New" identifier (e.g., 15677 (New)) indicates that a bug has already been created or logged before. In this way, the performance tool allows the crowdsourcing of bug generation so that bugs can be generated faster and routed to the correct team or users faster. In some embodiments, a performance issue becomes a "bug" when the user creates a bug, as described in more detail below.

The "count" attribute functionality corresponds to the quantity of times that the performance issue has been detected. For example, a process may have been run several times (e.g., 12), each by an individual user or team. And each time the process has been ran, a specific performance issue has been detected. Accordingly, the system may include counter logic that counts each time the specific counter logic detects the performance issue and responsively provides the count under the "count" attribute in the screenshot 1200 (e.g., displaying the number 12).

In an illustrative example, record 1201 indicates that: a unique identifier representing a soft hang performance issue was detected at 3:04 p.m., the soft hang performance was defined in the "PowerPoint file" activity, the soft hang has not been logged as a bug before (via the "create" identifier) and it has been detected twice. In some embodiments, in response to a selection of the record 1201 (or any record within the screenshot 1200), the call stack associated with the record 1201 is displayed within the element 505 of FIG. 5. In this way, specific instances of code can be identified where the performance issues were detected. FIG. 12 indicates that a bug has been logged via the "15677 (New)" indication. In response to logging the bug, the status identifier changes from the "create" to the "(New)" identifier as indicated under the "bug" column. In some embodiments, when a user selects a bug that has already been logged or created, the report that was generated for the bug is provided for display.

In some embodiments, a set of stack units of call stacks where a policy issue has been detected are consolidated or reduced to a unique identifier or hash. This is useful because certain performance issues, such as hangs, can be associated with and violated in several call stack units. A system can potentially identify every single stack unit as a separate hang performance issue even though they are part of the same hang for the same thread. However, this wastes system resources, such as memory, and can be confusing for users who are trying to quickly resolve performance issues. It is burdensome on developers and users to constantly analyze a particular issue that is really supposed to belong to another performance issue the user or developer has already analyzed. Further, the hash or unique identifier needs to be as stable as possible over time, and thus needs to be immune to code churning and other code modification.

Moreover, these unique identifiers or hashes are also generated so that they can be compared with other unique identifiers or hashes in a bug data store. In some embodiments, in response to detecting a particular performance issue, these unique identifiers or hashes are generated. In this way, users can determine what bugs associated with performance issues have been generated for crowdsourcing purposes, as described above. For example, as indicated in FIG. 12, the unique identifier may correspond to the indicia "15677," indicating that a unique hash and its associated bug has already been logged.

In some embodiments, the unique identifiers or hashes are generated in a specific manner for hangs and other performance issues that can be reflected in multiple stack units even they are the same performance issue. For example, embodiments detect which stack units account for a threshold proportion (e.g., percentage) of the performance issues for the entire call stack, their quantity, and determines where in the call stack the actual call stacks that violate performance are located, and based on this information, a hash is generated.

Figure 13A:
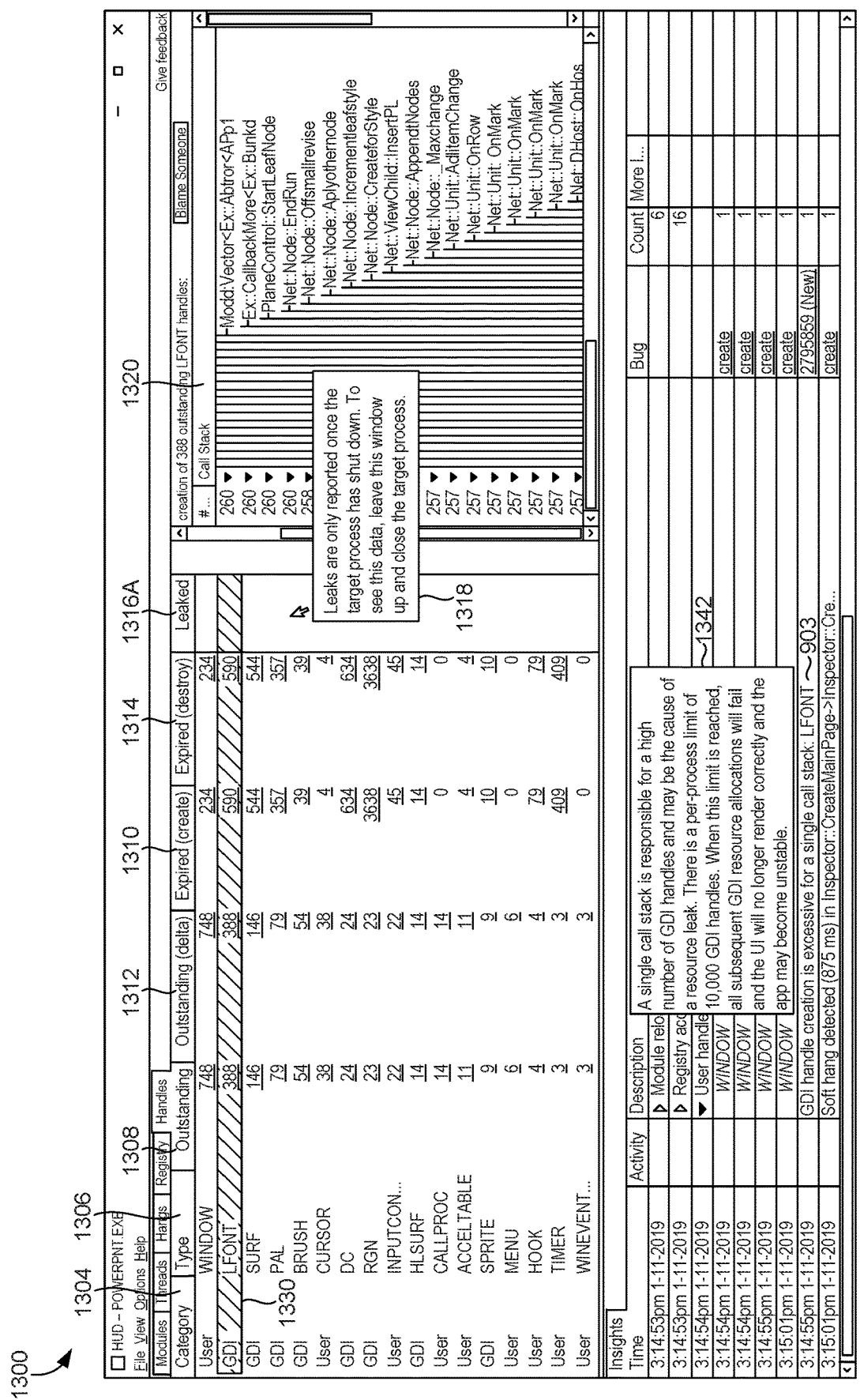
FIG. 13A is a screenshot of an example user interface for providing handle tracking and indications of potential resource leaks, in accordance with some embodiments.

FIG. 13A is a screenshot 1300 of an example user interface for providing handle tracking and indications of potential resource leaks, according to some embodiments. In some embodiments, the reference indictor component 230 generates the user interface and/or determines the data in the screenshot 1300. In some embodiments, the screenshot 1300 is displayed in response to a selection of the "handles" tab in the section 503 of FIG. 5. Each handle (or handle type) in FIG. 13A corresponds to each row or record. FIG. 13A illustrates all of the handles that have been created and destroyed for a currently running process. Each handle type as indicated in the column 1306 is associated with a category, as indicated in the column 1304. In some embodiments, the reference type generator 230-1 generates the handle identifier within the column 1306 and/or maps the handle type to the handle category under the column 1304, as described herein. For example, for the currently highlighted or selected record 1330 for the handle type "LFONT," the category it belongs to is a GDI handle. In some embodiments, in response to receiving a selection of any portion of the column 1304 or 1306, the corresponding records are sorted by the category or type of handles. For example, in response to receiving a user selection of the category column 1304, the reference indicator component 230 may sort the first set of records as all being GDI handles and the second set of records as being USER handles.

When a handle is created, it corresponds to a call (e.g., CREATE_solid brush) and when a handle is destroyed or terminated, a corresponding call is also issued (e.g., DELETE_object). In response to the creation call, embodiments detect (e.g., via tracing) a corresponding handle (e.g., via the reference indicator creation detector 230-2) and generate counts for each generated handle of the process for display in the columns 1308 and 1312. Alternatively, in response to a termination call, embodiments detect that a corresponding handle has been terminated (e.g., via the reference indicator expiration detector 230-3) and generate for display counts for each handle that have been terminated of the process in columns 1310 and 1314. The columns 1310 and 1314 correspond to a history of the quantity of each handle type that has been destroyed. Specifically, column 1310 illustrates a history of each handle that was both created ("create") and destroyed ("expired"), while column 1314 corresponds to only the quantity of handles that have been destroyed. In this way, users can quickly view a history of all of the handles that were created and destroyed.

Columns 1308 and 1312 correspond to a history of the quantity of each handle that has been created and remains outstanding or has not been destroyed. In some embodiments, the reference indicator creation detector 230-2 determines this information. The column 1312 corresponds to a history of outstanding handles (i.e., handles that have been created but not destroyed) since users have last cleared history. Clearing history may be useful when new features are created for a process and instead of viewing all of the outstanding handles (those handles that existed before and after the new feature was created), a user can: create a feature, clear the history (zeroing out the values within the delta column 1312), and then watch the values populate within the column 1312 to see handle count growth. The column 1308 corresponds to a history of all outstanding handles regardless of whether or not the user has cleared the history. As indicated in the screenshot 1300, each handle is ordered from top to bottom based on the count of the outstanding user handles within the columns 1308 and 1312. The higher the count, the higher the positioning of the corresponding handle record. The screenshot 1300 also shows a heat map indicator where the darker color (e.g., red) is superimposed or highlighting the top-most records and a lighter color is superimposed or highlighting the bottom-most records.

In response to a selection of any of the records or other portions of the screenshot 1300, the corresponding call stack can be shown. For example, a user may be concerned that the handle corresponding to the record 1330 has too many outstanding handles, as indicated by the 748 count in the column 1312. The user may then want to see exactly what set of calls or functions are responsible for the high count. Accordingly, the user may select the record 1330, which responsively causes the call stack 1320 to be displayed. The user may then locate the corresponding "create LFONT" call in the call stack 1320.

As described herein, users may set policies for various performance issues. For instance, a user may define that a performance issue exists (e.g., within a policy file similar to FIG. 11) when an outstanding handle count exceeds a threshold. The insight record 1340 of FIG. 13A, for example, illustrates that an outstanding GDI handle object has exceeded a 100 count threshold for a single call stack. The window 1342 displays a notification that the high handle count may be the cause of a resource leak and the system resources can consequently fail.

It is understood that although a particular quantity of outstanding handle counts are indicative of resource leaks for a currently running process, these counts in and of themselves are not definitively determinative of resource leaks according to some embodiments. This is because in certain embodiments definitive resource leak determinations are made when a process is shutdown or otherwise closed, as indicated in the window 318. Technically, there may be no resource leak when an application requests a removal of a reference indicator any time before shutdown or termination of a process even if the process has technically already used the reference indicator to access the resource. Accordingly, if an application has not requested a removal of a reference indicator by process termination, then resource leaks are definitively determined in some embodiments. Likewise, if an application has requested a removal of a reference indicator any time before process termination, then there is no resource leak. This is why the "leaked" column 1316A has not been populated yet in FIG. 13A. The leaked column 1316A represents the quantity of definitive resource leak determinations or resource leak determinations with higher confidence (as opposed to mere indications of resource leaks based on handle counts for a currently running process) relative to resource leak estimates made based on handle counts. Because the process is still running (termination of the process has not occurred), the counts within the column 1316A have not yet been populated.

Figure 13B:
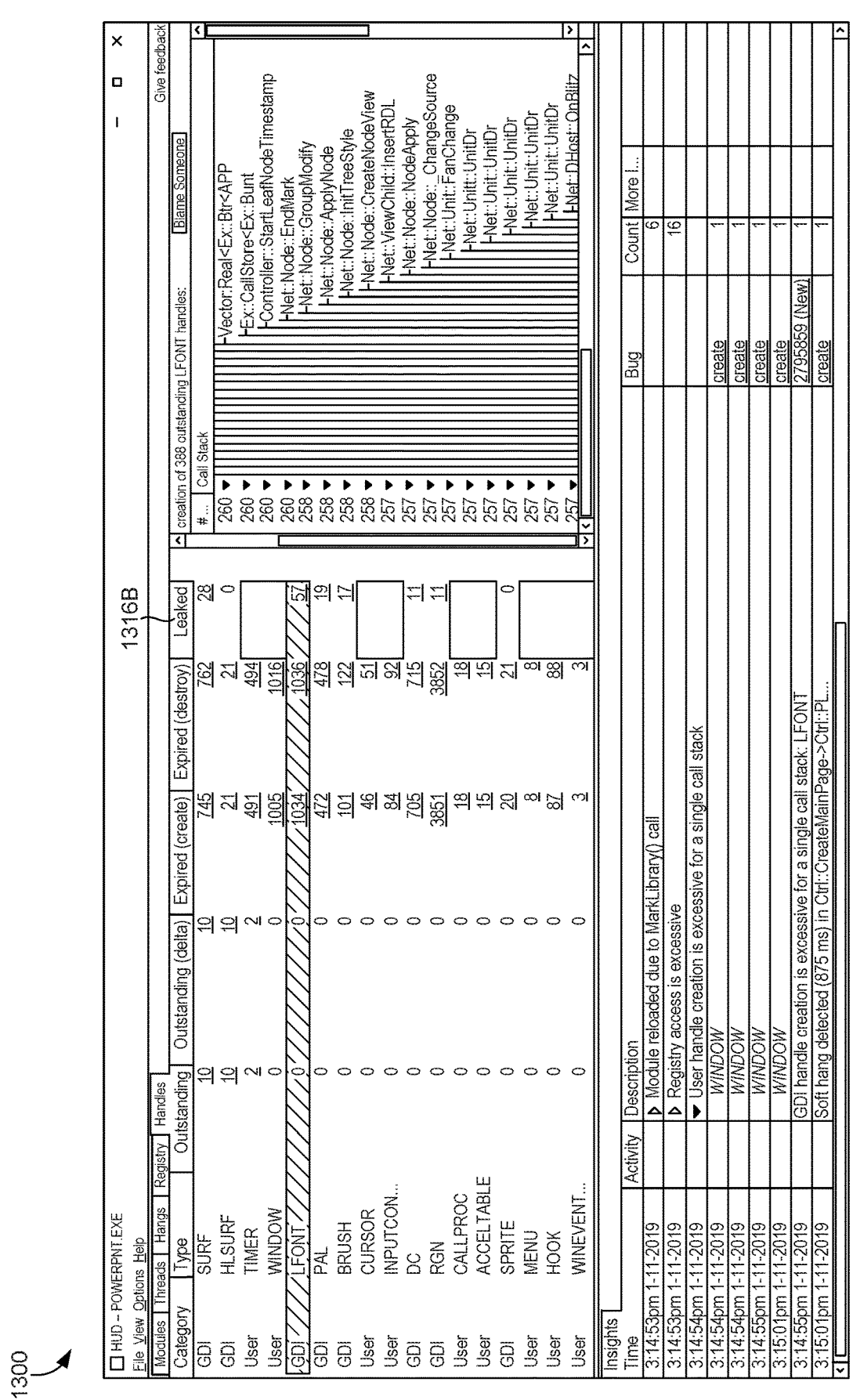
FIG. 13B is a screenshot of an example user interface illustrating definitive resource leaks, in accordance with some embodiments.

FIG. 13B is a screenshot 1301 of an example user interface illustrating definitive resource leaks or resource leak predictions, according to some embodiments. In some embodiments, the screenshot 1301 represents the screenshot 1300 at a second subsequent time after a corresponding application has been closed. In some situations, the user may want to view how many definitive resource leaks there are (e.g., as determined by the reference indicator leak detector 230-4) and follow the prompt of window 1318 of FIG. 13A. Accordingly, the user may issue a shutdown or close request (e.g., select a close button on a user interface) for a particular application and keep the application associated with the screenshot 1300 open. In some embodiments, in response to receiving an indication that the process has been shut down and that particular handles were freed by the kernel (indicating that the application did not request the handles to be freed), embodiments populate counts under the column 1316B of FIG. 13B. In an illustrative example, a user may have a performance tool application running to detect performance issues of a currently running process (e.g., MICROSOFT POWERPOINT). The user may then close the currently running process. Responsively, the performance tool application can receive an indication generated by a kernel that not only is the process getting ready to be terminated, but that a particular GDI handle is about to be removed. Embodiments (e.g., the leak detector 230-4) can then determine that this particular GDI handle leaked and then generate a displayed count within the column 1316B, which indicates that the particular handle leaked or is responsible for a resource leak.

Figure 14:
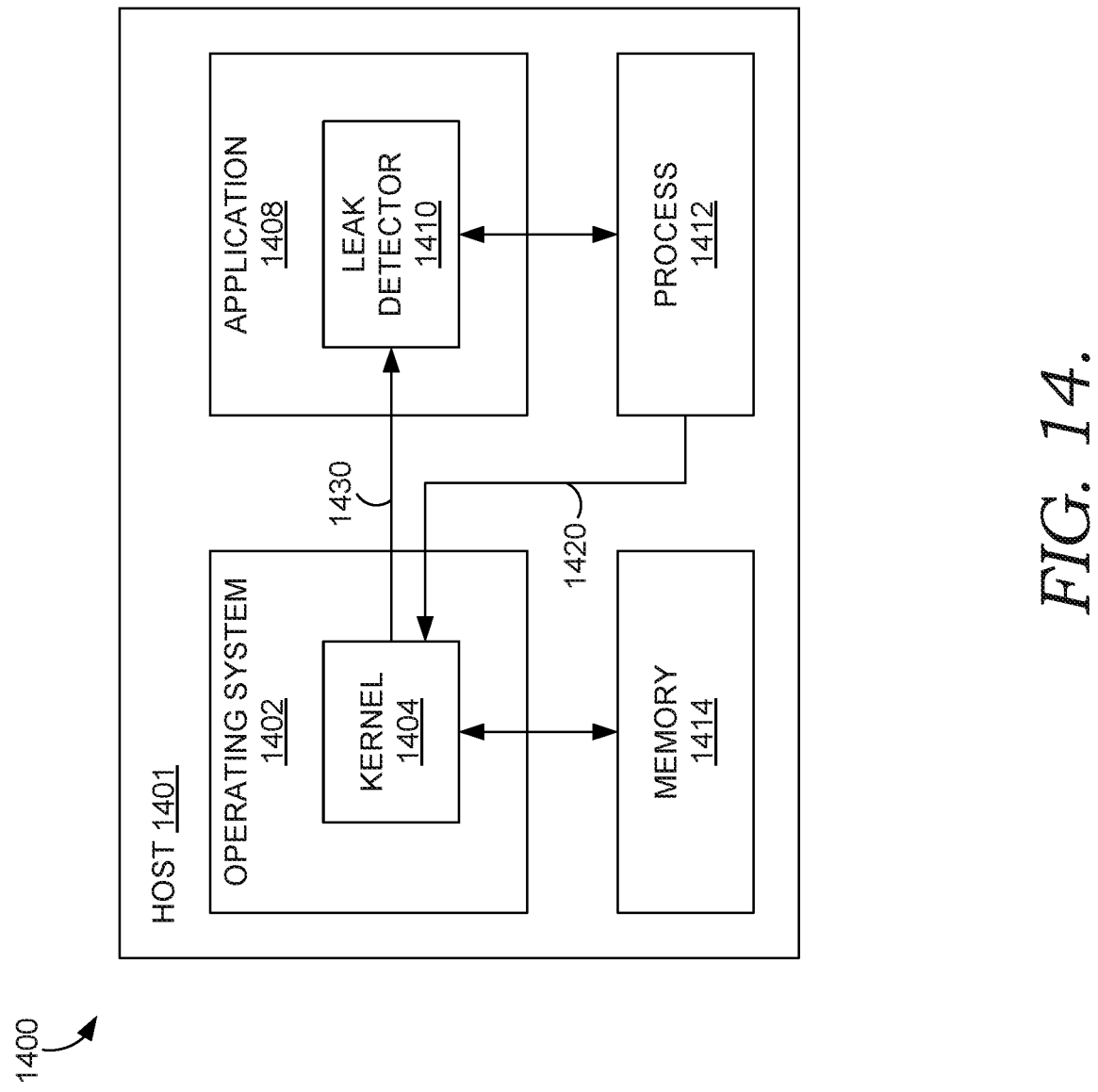
FIG. 14 is a block diagram of a system illustrating how resource leaks are detected, in accordance with some embodiments.

FIG. 14 is a block diagram of a system 1400 illustrating how resource leaks are detected, according to some embodiments. The host 1401 represents any hardware or virtual component that includes the operating system 1402, an application 1408 (e.g., a performance issue detection tool) and a process 1412. For example, the host 1401 can represent a physical computing system with physical components, such as a memory device, processor device, and the like. Alternatively, the host 1401 can represent a virtual component, such as a virtual machine (VM), container, or other component that is capable of running at least a portion of one or more applications or operating systems. In some embodiments, the host 1401 represents the computing device 1900 of FIG. 19.

The application 1408 includes a leak detector 1410. In some embodiments, the leak detector 1410 represents the leak detector 230-4 of FIG. 2 and vice versa. In some embodiments, the application 1408 represents a performance issue detection tool and may include some or all of the functionality as described with respect to the performance detector 250 of FIG. 2. In embodiments, the leak detector 1410 is configured to monitor the process 1412 for any resource leaks (whether inferred based on handle counts or definitively determined) that the processes 1412 is causing. The process 1412 may represent any suitable application or process whether deployed or not deployed. For example, the process 1412 can represent any locally stored application. The process 1412 in various embodiments is an application being tested for performance issues by the application 1408. In some embodiments, the process 1412 is the operating system 1402.

The operating system 1402 may be any suitable operating system that manages all hardware, software, and the interface between hardware and software within a computing device (e.g., MICROSOFT WINDOWS, LINUX, iOS, ANDROID, MACOS, or the like). The operating system 1402 includes the kernel 1404. The kernel 1404 is the central part of the operating system 1402 that manages operations between applications and hardware, such as memory (memory 1414) and CPU. Specifically, the kernel 1404 converts I/O requests from applications (e.g., process 1412) into an instruction set for GPU, CPU, memory, and the like. The kernel 1404 is thus a layer between an application and hardware that executes tasks from high application levels to low-level hardware I/Os. For example, in response to the process 1412 being launched, a user interface component may send a request to the kernel 1404. Responsively, the kernel 1404 then sends a request to CPU, memory, and the like to assign memory, CPU resources (e.g., registers, threads, etc.) for the request, among other things so that an application can seamlessly run.

The system 1400 illustrates how host components work together to detect resource leaks according to some embodiments. At a first time, the process 1412 may receive a termination or shutdown request. For example, a user may select a close button or other user interface element to terminate the process 1412 and the process 1412 may receive such request. In response to receiving the shutdown request, the process 1412 may call or communicate a message 1420 to the kernel 1404 at a second time subsequent to the first time. Additionally or alternatively, in response to receiving the shutdown request, the leak detector 1410 can receive an indication of the shutdown via tracing or other sampling methods of the process 1412. This message 1420 may be a request to the kernel 1404 for the kernel 1404 to terminate the process 1412. Before, termination of the process 1412 occurs, however, the kernel 1404 may generate a message 1430 (and/or actually send the message) at a third time subsequent to the second time to be communicated to the leak detector 1410. This message may be indicative of whether the kernel 1404 is the component responsible for destroying or terminating one or more associated reference indicators or the process 1412 is the component responsible for destroying or terminating one or more associated reference indicators. For example, the kernel 1404 can send or log an ETW event to announce that one or more reference indicators are about to be removed.

In some embodiments, the leak detector 1410 receives indication that the one or more reference indicators are about to be removed, via the message 1430, based on tracing, sampling, or other techniques that log each event generated, transmitted, or received by the process 1412. Alternatively or additionally, in some embodiments the leak detector 1410 receives this indication when the message 1430 is transmitted directly from the kernel 1404 to the leak detector 1410, via a communication interface (not shown) within the kernel 1404. The communication interface may be a programming interface that includes instructions to call or communicate with the leak detector 1410 in response to receiving any shutdown request by the process 1412. Accordingly, the leak detector 1410 can watch for any signals it receives from the kernel 1404 that is indicative of the kernel 1404 being the responsible component for removing reference indicators. Alternatively or additionally, the leak detector 1410 in some embodiments receives this indication by reading a log file in which the kernel 1404 is responsible for logging the message 1430 to. Accordingly, instead of sending the message 1430 directly to the leak detector 1410 or the process 1412, the kernel 1404 may log the message 1430 (or generate a corresponding structured record) to a log file after which point the leak detector 1410 reads and receives the indication.

At a fourth time subsequent to the third time, the leak detector 1410 determines whether there has been handle leaks in response to receiving the message 1430 (or receiving the indication of the message 1430). For example, if the leak detector 1410 only receives and indication that the process 1412 is going to shut down 1412 and nothing more (e.g., the kernel 1404 is not announcing that it is also closing reference indicators held by the process 1412), the leak detector 1410 can determine that there are no resource leaks because there are no messages from the kernel 1404 that it is also about to terminate any reference indicators. This often means that the process 1412 has already sent another request to the kernel 1404 at some other time before a shutdown of the process 1412 to have any reference indicators removed, meaning that there are no resource leaks. Alternatively, for example, if the message 1430 indicates that the kernel 1404 is about to remove or destroy any reference indicators, the leak detector 1410 can use this as a signal that there is a resource leak because the process 1412 has not requested or caused any reference indicators to be terminated. Therefore, the leak detector 1410 can determine that there is a resource leak. At a fifth time subsequent to the fourth time, at least a portion of a user interface can be generated based at least in part on the determination of whether there are any handle leaks by the leak detector 1410. For example, referring back to the screenshot 1301 of FIG. 13B, the count values within the leaked column 1316B can be provided showing how many resource leaks have been detected for each handle type.

At any time subsequent to the third time (e.g., parallel with or after the fourth/fifth time) the kernel 1404 may consult with memory 1414 and any objects stored therein, such as a handle table or other data structure that matches each handle with a particular resource and delete the particular record. Responsively, the reference indicator and/or record is deleted within the memory 1414. This memory consultation may occur regardless of whether the kernel 1404 is acting on its own initiative to remove reference indicators from memory 1414 (e.g., the kernel 1404 did not receive an requests from the process 1412 to remove reference indicators) indicative of a resource leak or whether the kernel 1404 has received a request from the process 1412 to remove the corresponding reference indicators from memory 1414 (not indicative of a resource leak). Additionally, any time subsequent to the third time, the kernel 1414 may also actually or officially terminate the process 1412.

Figure 15:
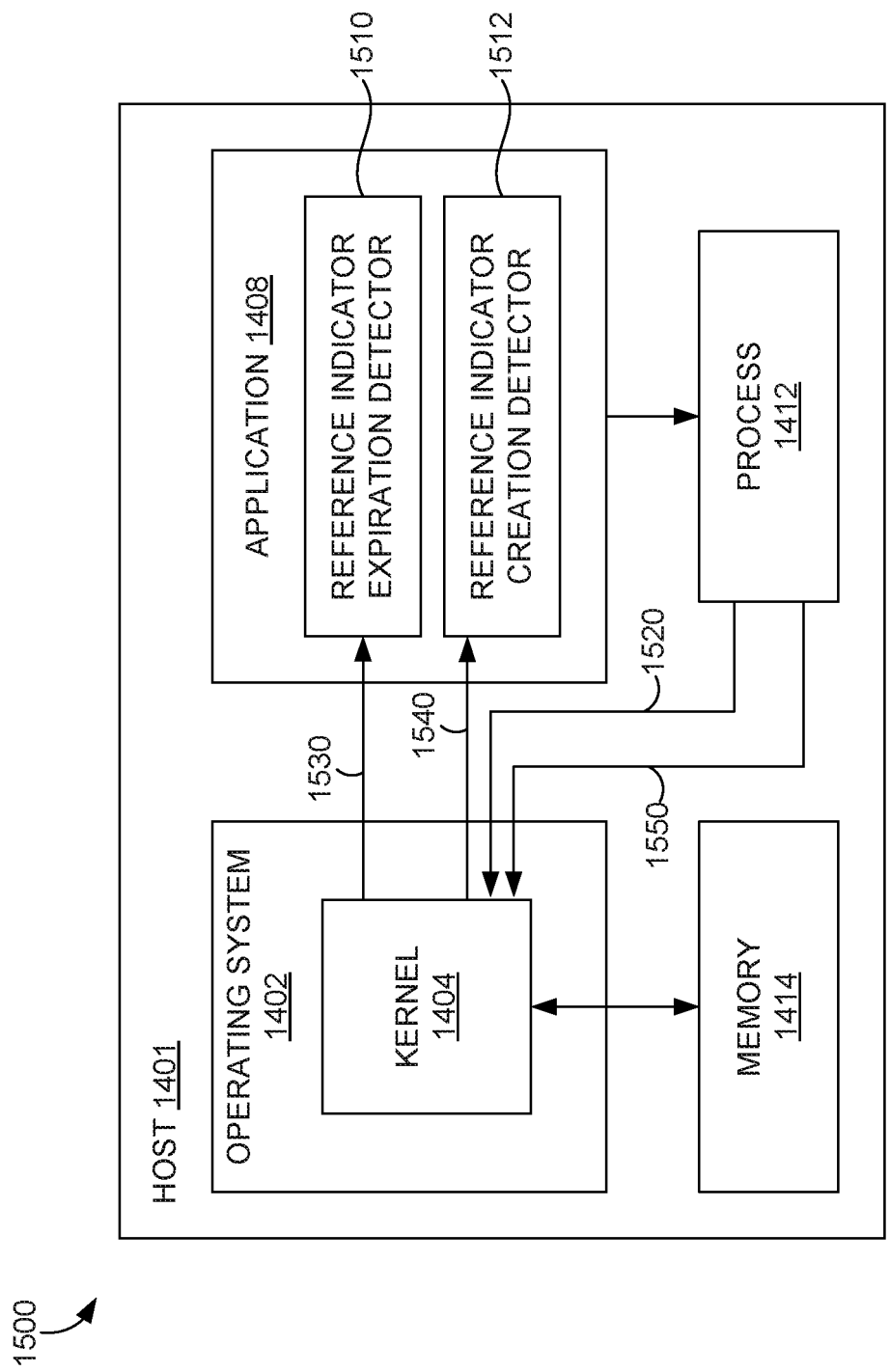
FIG. 15 is a block diagram of a system illustrating how the host of FIG. 14 can be used for determining the reference indicators that have been generated and terminated, in accordance with some embodiments.

FIG. 15 is a block diagram of a system 1500 illustrating how the host of FIG. 14 can be used for determining the reference indicators that have been generated and terminated, according to some embodiments. In some embodiments, the reference indictor expiration detector 1510 represents the reference indicator expiration indicator 230-3 of FIG. 2 and vice versa. Likewise, in some embodiments, the reference indicator creation detector 1512 represents the reference indicator creation detector 230-2 of FIG. 2 and vice versa. In some embodiments, the messages 1520, 1530, 1540, and 1550 represent communication messages of handle creation/destruction, which is indicative of resource leaks (e.g., as described with respect to the columns 1308, 1312, 1310, and 1314 of FIG. 13A). For example, in response to receiving a request to open the process 1412 (e.g., a user selects an application on a desktop), the process 1412 may send a message 1520 representing a request for a resource or reference indicator to be generated for access to a particular resource. Responsively, the kernel 1404 may generate a reference indicator in memory 1414 (e.g., generate a new entry in a handle table mapping a reference indicator to a resource). In some embodiments, the reference indicator creation detector 1512 intercepts the message 1520, via tracing or sampling, to obtain reference indicator counts and/or other functionality described with respect to the reference indicator creation detector 230-2. Responsively, the kernel 1401 may send the message 1540 or store an indication of the message to a log file, which is then used by the reference indicator creation detector 1512 to determine whether a reference indicator has been generated. Alternatively, in some embodiments, the message 1540 is directly transmitted, via a communication interface, to the reference indicator creation detector 1512 (or application 1408). The communication interface may be a programming interface that includes instructions to communicate to the application 1408 when a reference indicator has been created and/or destroyed. The reference indicator creation detector 1512 can generate values for user interfaces indicative of handle counts, as described, for example, with respect to the values within the columns 1308 and 1312.

In an example of destruction functionality, the process 1412 may send a message 1550 to the kernel 1404 that may represent a request for a reference indicator to be destroyed because it is no longer needed. In some embodiments, the reference indicator expiration detector 1510 intercepts the message 1550 through tracing or other sampling methods to perform its functionality to determine whether a reference indicator has been destroyed or terminated and/or other functionality described with respect to the reference indicator expiration detector 230-3. In some embodiments, the kernel 1404 may remove a corresponding reference indicator in memory 1414 (e.g., remove an entry in a handle table mapping a reference indicator to a resource) in response to receiving the message 1550. Responsively, in some embodiments the kernel 1401 may send the message 1530 or otherwise store an indication of the message in a log file, which is then used by the reference indicator expiration detector 1510 to determine whether a reference indicator has been destroyed or terminated. Accordingly, the reference indicator expiration detector 1510 can generate values for user interfaces indicative of expired or destroyed handle counts, as described, for example, with respect to the values within the columns 1310 and 1314. In additional or alternative embodiments, however, the message 1530 is directly transmitted from the kernel 1404 to the application 1408 via a communication interface and/or can be directly transmitted from the kernel 1404 back to the process 1412, which is then traced by the reference indicator expiration detector 1510.

Figure 16:
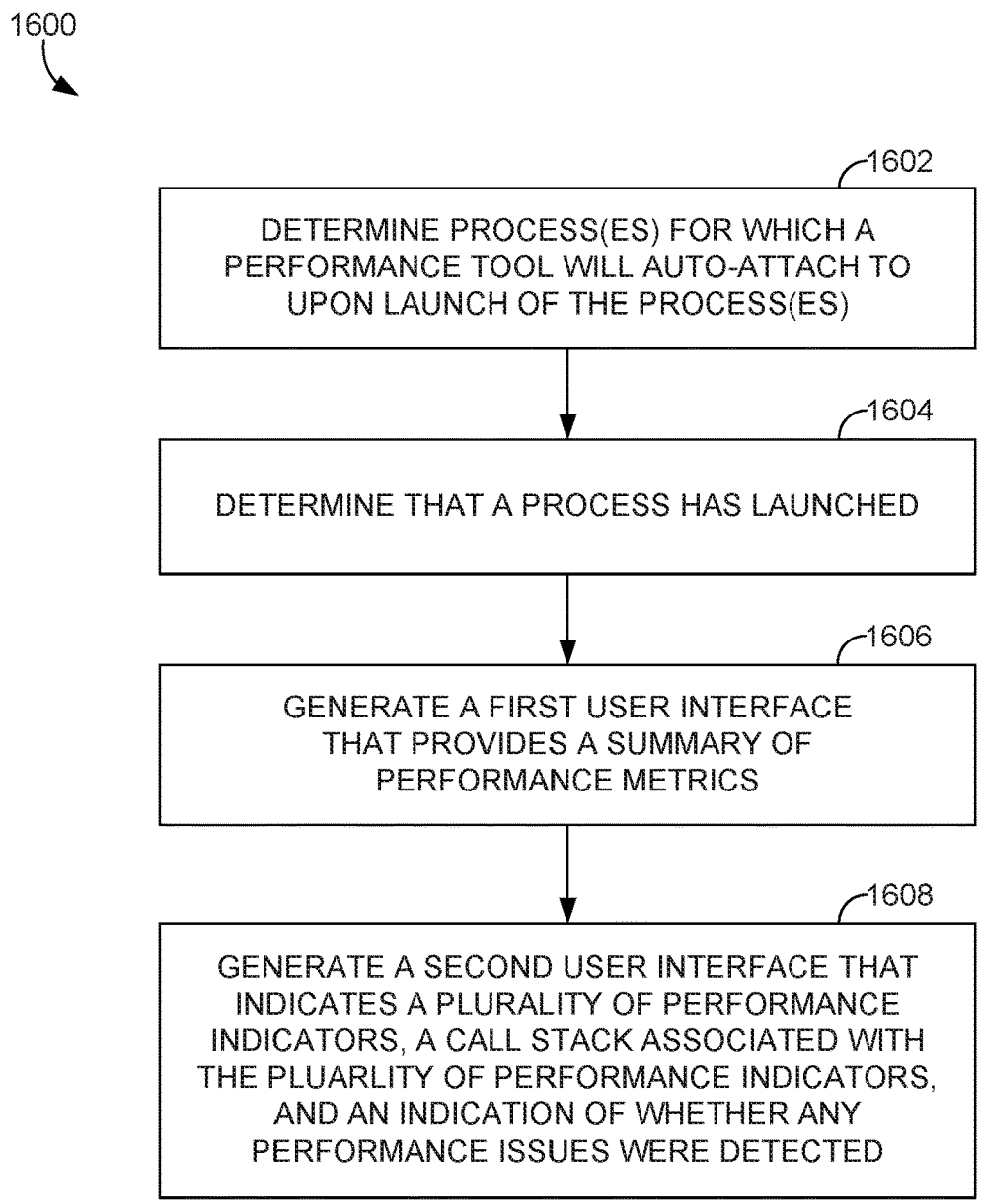
FIG. 16 is a flow diagram of an example process for providing multiple performance tool user interfaces, in accordance with some embodiments.

FIG. 16 is a flow diagram of an example process 1600 for providing multiple performance tool user interfaces, according to some embodiments. The process 1400 (and/or any of the functionality described herein (e.g., process 1700, 1800)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 1600, 1700, 1800, and/or any other functionality described herein.

Per block 1602, one or more processes for which a performance tool will attach to upon the process launch is determined. In this way, a currently running process may be one process of a plurality of processes defined in a field. In some embodiments, the defining in the field is indicative of requesting a performance tool to automatically analyze performance of the plurality of processes in response to the plurality of processes being launched. For example, referring back to FIG. 3, a user inputs three processes in the field 313 of the hydra element 30 so that, in hydra mode, the performance tool can watch when those processes are launched and, upon launch, automatically attach to the processes.

Per block 1604, it can be determined (e.g., by the indicator UI component 206) that a process has launched. For example, an operating system may receive a request from a user to open or start an application via a GUI selection of an application or command line request. Responsively, the operating system may be configured to automatically communicate with or cause a performance tool to receive the request at which point the performance tool performs block 1604. Per block 1606, a first user interface that provides a summary of performance metrics is generated (e.g., by the indicator UI component 206). In some embodiments, block 1606 occurs automatically and in response to block 1604. For example, the windows 403 and/or 403-1 can automatically be provided over the application 401 as indicated in FIGS. 4A and 4B. Alternatively, in some embodiments, there is no user interface provided. Rather, the performance tool can hide in the background and automatically analyze performance of the process in response to detecting that a process has launched per block 1604.

Per block 1608, a second user interface that indicates: a plurality of performance indicators, one or more call stacks associated with the plurality of performance indicators, and an indication of whether any performance issues were detected is generated (e.g., by the full view UI component 212). In some embodiments, in response to a selection of an element within the first user interface, the second user interface is caused to be displayed. The second user interface may provide more detailed performance metrics relative to the first user interface. For example, referring back to FIGS. 4 and 5, in response to the user selecting any portion of the window 403-1, the screenshot 500 can automatically be provided, which gives a more detailed view and data relative to the window 403-1. In some embodiments, the generating of the first or second user interface causes or improves the way a computer processes an application because the performance issues can be remedied, which means that a computer can efficiently process the application. For example, if a hang performance issue is reported, the hang time can be reduced, thereby allowing a CPU to execute instructions more proficiently.

In some embodiments, additional user interfaces or screenshots can be provided after block 1608. In various embodiments, this occurs in response to the user further selecting different elements or tabs within the second user interface. For example, in response to the user selecting any of the performance tabs in the element 503 of FIG. 5, or any other element in FIG. 5, the screenshots corresponding to FIGS. 6 through 13B may be displayed. Block 1608 represents a process whereby performance issues can be detected and associated call stacks may be determined and displayed. For example, there may be a unit of code that defines a function called "ramp" that multiplies or doubles a value of the variable n (e.g., def ramp(n): n=n*2/return n). Underneath the function a variable may be defined called X and assigning it a value (e.g., X=100). Underneath this variable definition, the ramp function is called as an output (e.g., print(ramp(x)). The first or bottom layer stack frame may store the variable and its value, X=100 and line number, such as 9. Line 9 may be where something needs printed or outputted (i.e., "print(ramp(s))") but first the "ramp" function must be run. Accordingly, this function calls the "ramp" function and sends it the variable value of 100. Because this function is active or is calling another function without returning values, the first call stack frame is generated or otherwise stored in the call stack. Each stack frame may represent each active function.

The "ramp" function (e.g., on line 3) then takes the parameter value of 100 passed from line 9, store the value 100 locally as a variable called "n," and generates a second stack frame on top of the first stack frame indicating this information. And, after the value 100 is doubled (i.e., to make 200) according to the "ramp" function, the value of 200 is then returned back to the function (i.e., "print(ramp (x)") that called the "ramp" function. In some embodiments, once the value is returned to the print function, the second stack frame is popped or removed indicating that the second function is no longer active or running. While the second call stack frame is still active (i.e., it has not been popped off at this point), the performance tool can indicate that there was a hang policy issue for both call stack frames—one hang when the "print(ramp(x))" function called the "ramp" function and another hang when the "ramp" function is executing.

A unique identifier associated with both the performance issue and a set of call stacks is generated. Using the illustration above, for example, both of the stack frames can be represented together as a single hash value and "hang" performance issue. In some embodiments, the unique identifier can be or represent a hash (e.g., CRC) as generated by the insights component 222. In another example, the unique identifier can correspond to the identifier in FIG. 12C indicating that the bug has been logged.

Figure 17:
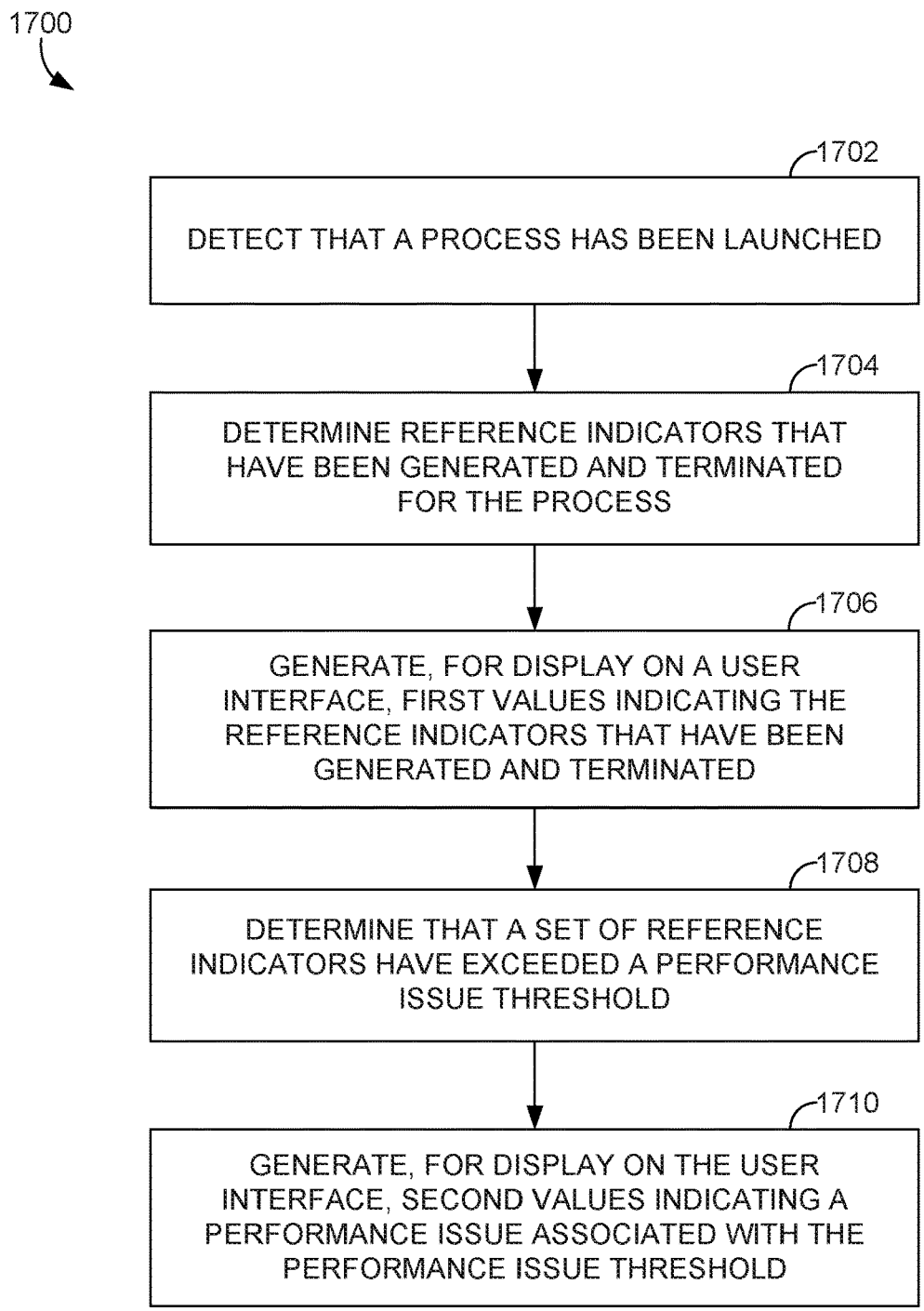
FIG. 17 is a flow diagram of an example process for generating values indicating a performance issue associated with reference indicators, in accordance with some embodiments.

FIG. 17 is a flow diagram of an example process 1700 for generating values indicating a performance issue associated with reference indicators, according to some embodiments. Per block 1702, it is detected (e.g., via the launching component 204) that a process has been launched. For example, responsive to a user inputting the process in the field 313 of FIG. 3, embodiments automatically detect that a corresponding process is launched. Per block 1704, reference indicators that have been generated and terminated for the process are determined (e.g., by the reference indicator creation detector 230-2 and the reference indicator expiration detector 230-3). Embodiments determine a plurality of reference indicators that have been generated terminated for the process while the process is running. A single process or application typically causes generation of several reference indicators that each represent a particular feature of the process, such as an object (e.g., a window and a menu, etc.) that together can represent the entire process or a portion of the process.

In an illustrative example of block 1702, referring back to FIG. 15, the process 1412 can send the messages 1520 and/or 1550 to the kernel 1404 indicative of sending a request to create a resource indicator and/or remove a resource indicator from the memory 1414. The kernel can then responsively create/terminate records corresponding to the resource indicators and send the messages 1530 and 1540 at which point the reference indicator expiration detector 1510 and/or the reference indicator creation detector 1512 receives the respective messages (or indications of the messages) to determine what reference indicators have been generated and terminated. Alternatively, the kernel 1401 can log, as an ETW event, the messages 1530 and/or 1540 (or indications of the message) to a log file after which the reference indicator expiration detector 1510 and/or reference indicator creation detector 1512 receives the corresponding log entries. Alternatively, the kernel 1404 can send the messages 1530 and/or 1540 directly to the process 1412, which is then traced by the application 1408.

In some embodiments, the determining of the reference indicators that have been generated and destroyed at block 1704 includes determining the values and indicators as illustrated in columns 1310 and 1314 of FIG. 13A (the expired columns). Alternatively or additionally, in some embodiments, the determining of the reference indicators that have been generated and destroyed at block 1704 includes determining that a set of reference indicators that have been generated but have not been terminated. For example, the set of reference indicators that have been generated but have not yet been terminated may be the reference indicator values as illustrated under the "outstanding" columns 1308 and 1312 of FIG. 13A.

In some embodiments, the reference indicators are at least one of: a graphics object identifier (e.g., a GDI object identifier) and a user handle. In some embodiments, a graphics object identifier includes an application programming interface or other reference indicator of an operating system. In some embodiments, the graphics object identifier is generally responsible for representing a specific graphical object (e.g., a font, bitmap, brush, pen, or device context (drawing surface), etc.) and transmitting them to output devices (e.g., monitors and printers). Graphics object identifiers enables applications to use graphics and formatted text. For example, a graphics object identifier can be responsible for tasks such as drawing lines or curves, fonts, brushes, colors, sizes and handling palettes. A graphics object identifier is not a user handle in particular embodiments. A user handle generally represents a user interface element (e.g., a desktop, a window (and all elements within a window), a menu (and all the elements within a menu), a cursor, a set of icons, a set of buttons, and the like).

Per block 1706, first values indicating the reference indictors that have been generated and terminated (as determined at block 1704) are generated for display on a user interface. For example, referring back to FIG. 13A, count values indicative of the quantity of handles created and terminated under the columns 1308, 1312, 1310, and 1314 for particular handles or handle types are generated and displayed. Some embodiments additionally or alternatively generate a mapping for a reference indicator to a category that the reference indicator belongs to and provides, for display to the user interface, the category as a column identifier. For example, referring back to FIG. 13A, the category identifiers under the columns 1304 and/or 1306 can be generated and displayed to the screenshot 1300. In some embodiments, the mapping is performed by the reference indicator type generator 230-1 as described herein.

Per block 1708, it is determined that a set of reference indicators have exceeded a performance issue threshold associated with a resource leak. In some embodiments, the determination at block 1708 is of a set of reference indicators that have been generated but have not been terminated, as indicated "outstanding" columns 1308 and 1312 of FIG. 13A. In some embodiments, the performance issue threshold is a count threshold such that a quantity of the set of reference indicators that exceeds the count threshold is indicative of too many reference indicators having been generated (but not removed). For example, as indicated in the "insights" record 1340 and the notification 1342 of FIG. 13A, the GDI handle has exceeded a count threshold of 10,000. In some embodiments, the count threshold takes into account or sums up each outstanding or created reference indicator for each reference indicator or reference indicator type. Referring back to FIG. 13A, for example, the handle count can be computed by adding up each value count of each record for a particular GDI or USER handle type. Alternatively, the count threshold takes into account only one reference indicator's counts. For example, referring back to FIG. 13A, the count threshold can be based off of whether the record 1330's outstanding count of 330 exceeds the count threshold.

In various embodiments, the determining that the set of reference indicators have been generated is only an indication that there might be a resource leak. This is because in certain situations, a resource leak is not definitively determined until a process is shut down, as indicated in the message 1318 of FIG. 13A for example. As described herein in certain embodiments, technically a process can request that a reference indicator be removed any time before shutdown and still not be considered a leak. In this way, users can receive hints or predictions that there are resource leaks when a reference indicator count (e.g., for a given type of reference indicator) is above a threshold for a currently running process. And after getting such hints, users can determinatively see if there are any true resource leaks by shutting down the process, as indicated in FIGS. 14 and 13B, for example.

Per block 1710, second values indicating a performance issue associated with the performance issue threshold are generated (e.g. by the insights component 222) for display on the user interface. Based at least in part on the determining that the set of reference indicators have exceeded the performance issue threshold, some embodiments generate, for display on the user interface, second values indicating a performance issue associated with the performance issue threshold of block 1708. For example, referring back to FIG. 13A, under the "insights" component, the record 1340 and notification 1342 have a generated values of "GDI handle creation is excessive for a single call stack: LFONT," which indicates a performance issue associated with the 10,000 count threshold. Notification 1342 is indicative of generating a message indicating the set of reference indicators have exceeded the count threshold and is associated with a resource leak.

In some embodiments, block 1710 includes or is succeeded/proceeded by determining a location in a call stack for which the performance issue has been detected and causing display to the user interface of the location, as described for example, with respect to block 1608 of FIG. 16. For example, referring back to FIG. 13A, the call stack 1320 corresponding to the particular handle or record 1330 is displayed.

In some embodiments, there is definitive resource leak determination functionality after block 1710 (not shown). Embodiments can receive a first indication that the process (indicated in block 1702) has been requested to be shut down. Then based on the first indication, a second indication that an operating system kernel will remove the set of reference indicators can be received. Then a resource leak can be detected based at least in part on the first indication and the second indication. For example, FIG. 13B, and FIG. 14 describes these steps that the application leak detector 1410 performs. In an illustrative example, the first indication can be a tracing event or message (e.g., an ETW event) or log file indication that the process has been requested to be shutdown. The second indication can also be a tracing event or message, such as an ETW event or log file indication that an operating system component will remove the set of reference indicators.

Figure 18:
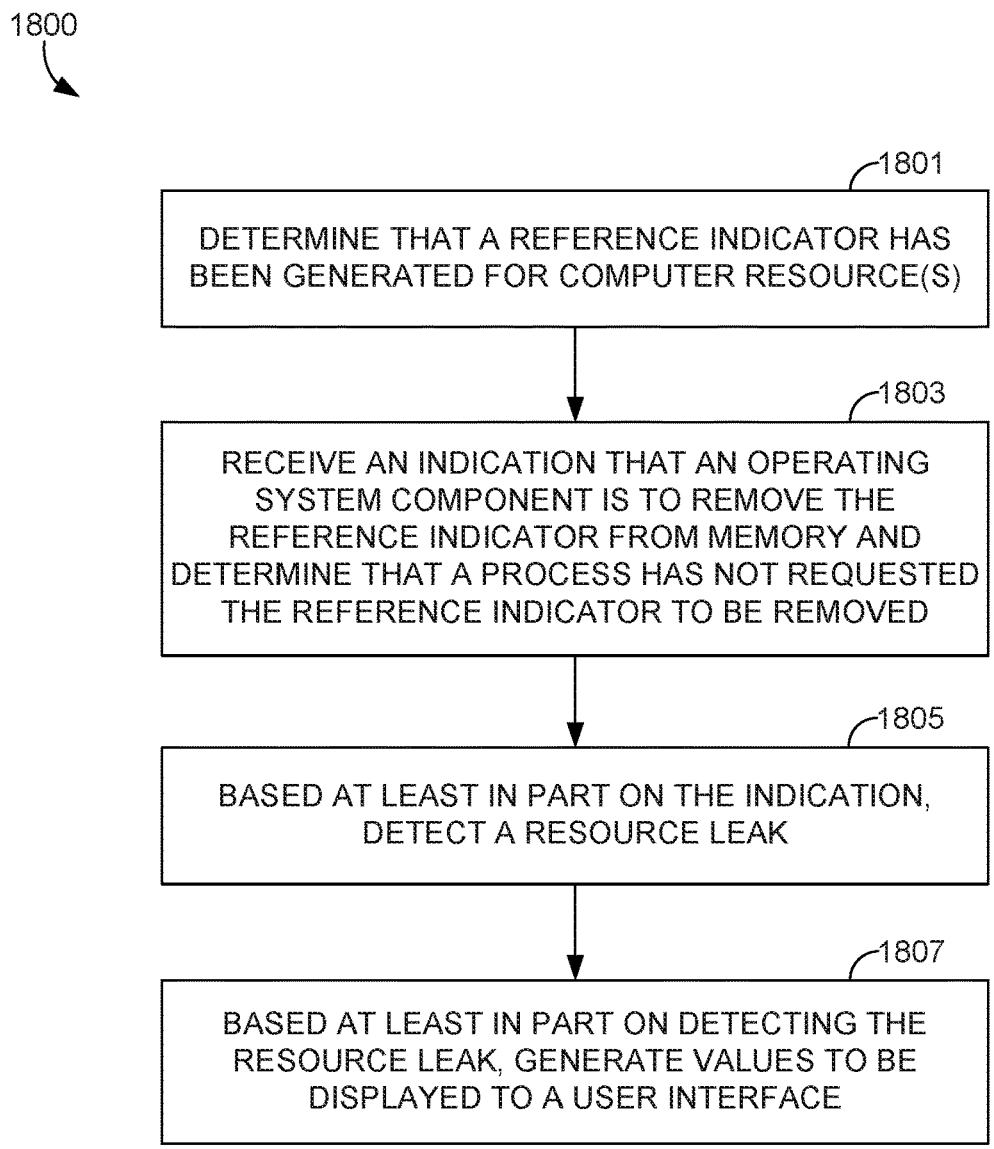
FIG. 18 is a flow diagram of an example process for detecting a resource leak and generating associated values for a user interface, in accordance with some embodiments.

FIG. 18 is a flow diagram of an example process 1800 for detecting a resource leak and generating associated values for a user interface, according to some embodiments. In some embodiments, the process 1800 occurs (or most of the blocks occur) after the process 1700 of FIG. 17. Per block 1801, it is determined that a reference indicator (e.g., a handle) has been generated for one or more computing resources. The reference indicator includes an identifier that references a computing resource that a process has requested to access. In some embodiments, the determination at block 1801 can be performed by the reference indicator creation detector 230-2, or 1512. In some embodiments, the reference indicator is one of: a graphics object identifier (e.g., a GDI object identifier) and a user handle, as described herein with respect to FIG. 17.

In some embodiments, block 1801 is succeeded/preceded by other functionality, such as generating, for display on the user interface, third values indicative of a quantity of reference indicators that have been created by the process (but not yet destroyed), as described, for example, with regard to the outstanding columns 1308 and 1312 of FIG. 13A. This may represent a portion of the block 1704 of FIG. 17 where the reference indicators that have been generated are determined for a process. Likewise, in some embodiments, block 1801 is succeeded/proceeded by generating, for display on the user interface, fourth values indicative of another quantity of reference indicators that have been terminated for a respective type of reference indicator of the process, as described, for example with regard to the expired columns 1310 and/or 1314 and block 1704 of FIG. 17. Some embodiments alternatively or additionally generate a mapping for the reference indicator to a category that the reference indicator belongs to and provides, for display to the user interface, the category. For example, this is described with respect to the category column 1304 of the screenshot 1300 of FIG. 13A.

Per block 1803, an indication that an operating system component (e.g., a kernel) is to remove the reference indicator (e.g., a handle) from memory is received and it is determined that a process has not requested the reference indicator to be removed. In response to the receiving of the indication, some embodiments determine that the reference indicator is still present or stored in the memory. This indication at block 1803 can be any suitable indication that is received in any suitable manner. For example, the indication can be one or more messages received directly from a kernel (e.g., the message 1430 is directly sent from the kernel 1404 to the application 1408) or one or more messages received by a process that is traced by an application, as described, for example with respect to FIG. 14 where the kernel 1404 can send the message 1430 to the process 1412 in some embodiments, which is captured or traced by the leak detector 1410. Alternatively or additionally, a kernel can log the indication to a log file, which is then read by an application component (e.g., the leak detector 1410).

In some embodiments, the determination that the process has not requested the reference indicator to be removed at block 1803 and/or determination that the references indicator is still present in memory is based on the indication and/or other information and can be an estimate that the process has not requested the reference indicator to be removed. For example, embodiments can determine that the process has been requested to be shut down (e.g., a user closes a user interface window of an application) based on receiving tracing or logging events from the process or kernel via sampling or other techniques. Responsively, or subsequent to this, embodiments can receive the indication that the operating system will remove the reference indicator from memory. Responsively, embodiments can determine or predict that a process has therefore not requested the reference indicator to be removed based at least in part on the indication and the determining that the process has been requested to be shut down. This is because the process should have requested removal of the reference indicator by the time shutdown requests are made and more specifically, by the time indications are received that an operating system component is to remove reference indicators from memory subsequent to shut down requests. Put another way, embodiments can both detect that a shutdown request has been made and receive indications that an operating system component is to remove the reference indicator from memory, and use these factors together as strong signals of a resource leak because the reference indicators were never requested to be removed until after shutdown request.

In some embodiments, prior to the receiving of the indication the operating system component will remove the reference indicator from memory a first user interface is caused to be displayed. The first user interface indicates a summary of performance metrics and in response to a selection of an element within the first user interface, a second user interface is caused to be displayed that provides more detailed performance metrics relative to the first user interface. This is described, for example with respect to FIG. 16.

Per block 1805, a resource leak is detected (e.g., by the leak detector 230-4, 1410) based at least in part on the indication. Based at least in part on the receiving of the indication, the resource leak can be automatically detected. The resource leak is at least partially indicative of the process likely not having requested the reference indicator to be removed. Alternatively or additionally, based at least in part on the indication and the determining that the process has been requested to be shutdown (or determining that the reference indicator is still present in memory), it can be predicted that there is a resource leak. In some examples, embodiments receive another indication that the process has been requested for shutdown. The receiving of the indication that the operating system component will remove the reference indicator occurs in response to the receiving of another indication such that the automatically detecting of the resource leak is further based on the another indication.

Per block 1807, based at least in part on the detecting of the resource leak, values are generated, which are to be displayed to a user interface. Alternatively or additionally block 1807 can represent a notification that is generated, and based at least in part on the automatically detecting of the resource leak, the notification is generated. In some embodiments, the notification includes first values (and/or second values) that indicate the resource leak. In some embodiments, the notification is caused to be displayed on a user device. For example, referring back to FIG. 13B, the values under the leaked column 1316B can represent the first values (counts or quantity of leaks for a respective handle/handle type). In some embodiments, the generating of the first values or notification occurs in response to the process being shut down. For example, referring back to FIG. 14, a user can close a user interface element of the process 1412, and after close is complete, the first values can be populated under the column 1316B of application 1408 for example. In some embodiments, block 1807 includes determining a location in a call stack for which the resource leak has been detected and causing display in the user interface of the location. For example, referring back to FIG. 13B, after the values are populated under the column 1316B, the location of the corresponding call stack(s) 1320 can be generated and displayed.

In some embodiments, based at least in part on the generating of the first values (indicated in block 1807) and a modification of code within the process, second values indicative of the resource leak no longer being present can be generated to a user interface or otherwise be sent a user device as a notification. In some embodiments before the second values are presented, based at least in part on the generating of the first values and a modification of code within the process, embodiments can cause a reduction in computing resource consumption by at least partially causing the process to request removal of the reference indicator. Some embodiments "cause" a reduction in computing resource consumption and the process to request removal of the reference indicator by presenting the first values to the user interface. By presenting the first values, the user receives a notification or indication that there is a resource leak at a particular call stack location (e.g., the process is not requesting the reference indicators to be removed). Then a developer or tester can then modify programming code, such as fixing program calls to have the process request removal of the reference indicator, which further causes the resource leak to no longer be present. Then, subsequent to retesting the process, the second values can be caused to be displayed to the user interface, which is indicative of the resource leak no longer being present. In this way, by determining the second values before they are displayed to the user interface, embodiments verify that the process (and not the operating system component alone) requests removal of the reference indicator. However, "verifying" that the process requests removal of the indicator need not occur via the second values of the user interface. Rather, in some embodiments, verifying can alternatively or additionally include sending a message or notification to a user device directly stating that there is no longer a resource leak and the like. In response, a developer or tester can then modify programming code, such as fix program calls to have the process request removal of the reference indicator.

The resource leak no longer being present reduces computing resource consumption as described herein. After a user views a resource leak for one or more reference indicators on a user interface (the first values), the user can then view corresponding call stacks and log the resource leak as a bug, which shows the corresponding call stacks. The call stacks can be used by developers to change call functionality or otherwise modify code in the process such that the process will correctly request removal of the one or more reference indicators after the process no longer needs the one or more reference indicators. Accordingly, subsequent to this code modification, an application (e.g., the application 1408 can monitor the same process (e.g., the process 1412) (e.g., via tracing or other logging techniques)) that originally contained the resource leaks can be run or re-tested, the results of which indicate that there are no more resource leaks, thereby reducing computing consumption. The second values can then be generated (indicating no resource leak, such as a zero count of handles that are leaked). Therefore, because there is no longer a resource leak, reference indicators that are no longer in use are freed from memory, thereby freeing up memory space, reducing CPU utilization, and the like. In an example illustration, the first values can represent the count values under the column 1316B of FIG. 13B. A user can view this and log the resource leaks as a bug, after which a developer can modify code such that there are no more resource leaks. Then the user can open the same application that gives the view of FIG. 13B, except that the column 1316B may have 0 values or otherwise indicate that there are no more resource leaks (the second values) based on the code modification.

Some embodiments communicate the notification at block 1807 to the process to facilitate removal of the reference indicator from memory. For example, the notification can be a control signal or message sent to the process (instead of or in addition to a user interface or display message to a user) so that the process can remove the reference indicator from memory responsive to receiving of the message. In some embodiments, if the process cannot remove a reference indicator from memory unilaterally (e.g., because of a programming bug or other call issue), the process can cause a message to be displayed to a user device such that the user can change call functionality or otherwise modify code in the process such that the process will correctly request removal of the one or more reference indicators after the process no longer needs the one or more reference indicators.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

Figure 19:
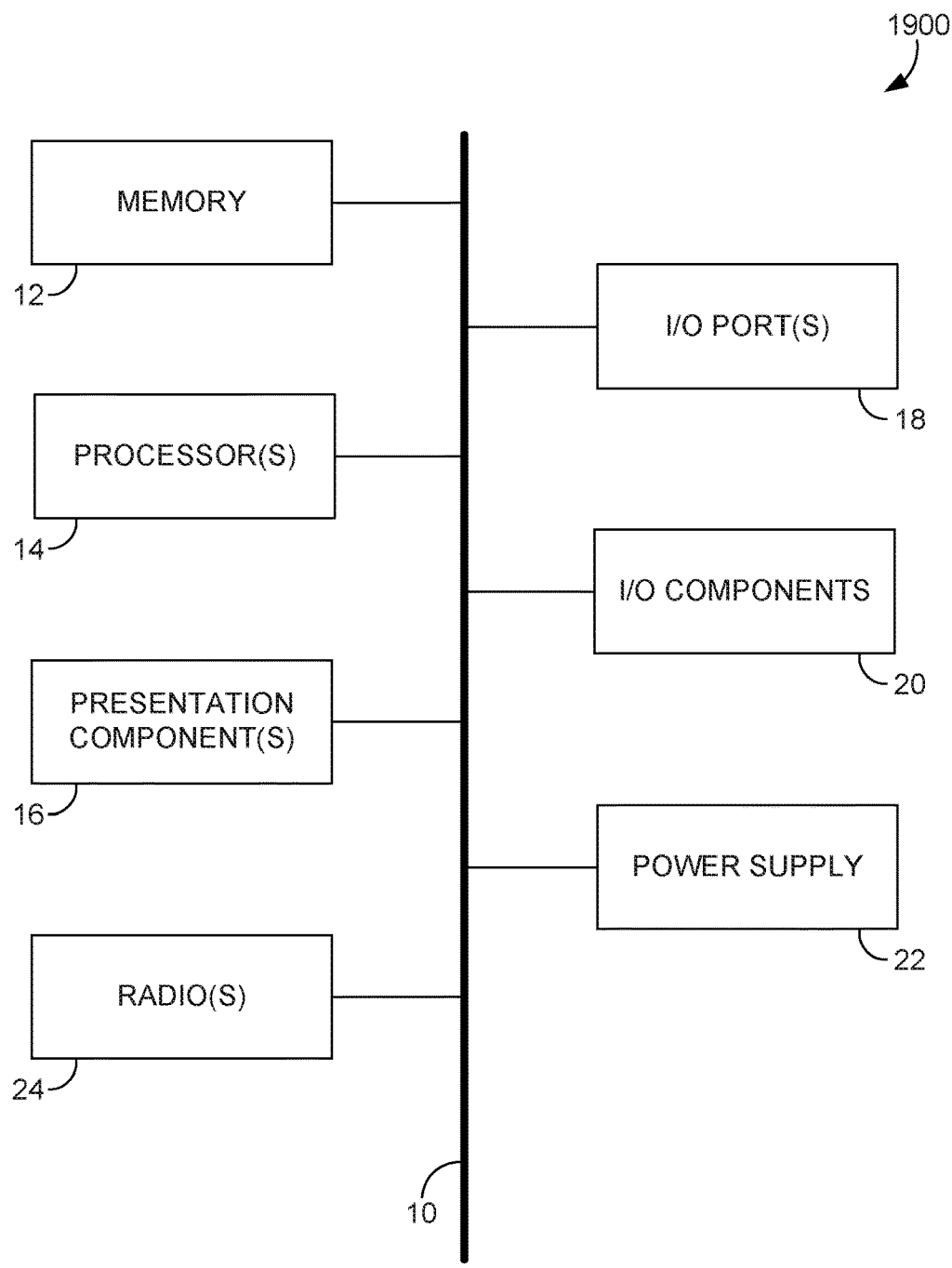
FIG. 19 is a block diagram of a computing device, in accordance with some embodiments.

With reference to FIG. 19, computing device 1900 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 19 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 19 and with reference to "computing device." Computing device 1900 can perform some or all of the functionality as described, for example, with respect to processes 1600, 1700, and/or 1800 of FIGS. 16, 17, and 18 respectively.

Computing device 1900 typically includes a variety of computer-readable media. Computer-readable media can be any available media that can be accessed by computing device 1900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 1900 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 1900 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1900. The computing device 1900 may be equipped with depth cameras, such as stereoscopic camera systems, infrared camera systems, RGB camera systems, and combinations of these, for gesture detection and recognition. Additionally, the computing device 1900 may be equipped with accelerometers or gyroscopes that enable detection of motion. The output of the accelerometers or gyroscopes may be provided to the display of the computing device 1900 to render immersive augmented reality or virtual reality.

Some embodiments of computing device 1900 may include one or more radio(s) 24 (or similar wireless communication components). The radio 24 transmits and receives radio or wireless communications. The computing device 1900 may be a wireless terminal adapted to receive communications and media over various wireless networks. Computing device 1900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, and the like.) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A computer-implemented method comprising: determining that a reference indicator references a computing resource; receiving an indication that an operating system component is to remove the reference indicator from memory; in response to the receiving of the indication, determining that the reference indicator is still present in the memory; based at least in part on the receiving and the determining, automatically detecting a resource leak; and based at least in part on the automatically detecting of the resource leak, generating a notification that indicates the resource leak.

Clause 2. The method of clause 1, further comprising verifying that the process requests removal of the reference indicator.

Clause 3. The method of clause 1, further comprising causing the notification to be displayed on a user device.

Clause 4. The method of clause 1, further comprising communicating the notification to the process to facilitate removal of the reference indicator from memory.

Clause 5. The method of clause 1, wherein the notification further indicates a quantity of reference indicators that have been created by the process but not yet terminated; and further comprising causing the notification to be displayed on a user device.

Clause 6. The method of clause 5, wherein the notification further indicates another quantity of reference indicators that have been terminated for a respective type of reference indicator of the process.

Clause 7. The method of clause 1, further comprising generating a mapping for the reference indicator to a category that the reference indicator belongs to and providing the category for display via a user device.

Clause 8. The method of clause 1, wherein the generating of the notification occurs in response to the process being shut down.

Clause 9. The method of clause 1, causing, prior to the receiving of the indication that the operating system component is to remove the reference indicator from memory, a first user interface to be displayed, the first user interface indicating a summary of performance metrics, and in response to a selection of an element within the first user interface, causing a second user interface to be displayed that provides more detailed performance metrics relative to the first user interface.

Clause 10. A system comprising: a processor; and a computer storage media storing computer-useable instructions that, when used by the processor, causes the processor to perform a method, the method comprising: detecting a process launch; determining a plurality of reference indicators that are generated and terminated for the process while the process is running, each of the plurality of reference indicators referencing a respective computing resource; generating, for display on a user interface, first values indicating the plurality of reference indicators that are generated and terminated; determining that a set of reference indicators that are generated but are not terminated exceed a performance issue threshold associated with a resource leak; and based at least in part on the determining that the set of reference indicators exceed the performance issue threshold, generating, for display on the user interface, a second value indicating a performance issue associated with the performance issue threshold;

Clause 11. The system of clause 10, wherein the method further comprises: receiving a first indication that the process has been requested to be shut down; based on the first indication, receiving a second indication that an operating system kernel will remove the set of reference indicators; and detecting a resource leak based at least in part on the first indication and the second indication.

Clause 12. The system of clause 11, wherein the performance issue threshold is a count threshold such that a quantity of the set of reference indicators that exceeds the count threshold is indicative of too many reference indicators that are generated but not removed.

Clause 13. The system of clause 12, the method further comprising generating a message indicating the set of reference indicators have exceeded the count threshold and is associated with the resource leak.

Clause 14. The system of clause 10, wherein the reference indicator is one of a graphics object identifier and a user handle.

Clause 15. The system of clause 10, the method further comprising generating a mapping for a reference indicator to a category that the reference indicator belongs to and providing, for display to the user interface, the category as a column identifier.

Clause 16. The system of clause 10, wherein the determining that the set of reference indicators that are generated but not terminated occurs while the process is still running.

Clause 17. The system of clause 10, the method further comprising determining a location in a call stack for which the performance issue is detected and cause display to the user interface of the location.

Clause 18. The system of clause 10, wherein the determining that the set of reference indicators is generated but not terminated is only an indication that there might be the resource leak, and wherein the resource leak is not definitively determined until the process is shutdown.

Clause 19. A computer storage media having computer-executable instructions embodied thereon that, when executed, by a processor, causes the processor to perform a method, the method comprising: determining that a handle is generated for a computing resource that a process requests to access, the handle includes an identifier that references the computing resource; determining that the process is requested to be shut down; receiving an indication that an operating system kernel will remove the handle from memory; based at least in part on the indication and the determining that the process is requested to be shut down, predict that there is a resource leak, the resource leak is at least partially indicative of the process likely not having requested the handle to be removed from the memory; and based at least in part on the prediction of the resource leak, generating a notification that indicates the resource leak.

Clause 20. The computer storage media of clause 19, wherein the notification is communicated to the process to facilitate removal of the handle from memory

The invention claimed is:

1. A system comprising: a processor; and a computer storage media storing computer-useable instructions that, when used by the processor, causes the processor to perform a method, the method comprising: detecting a process launch; determining a plurality of reference indicators that are generated and terminated for the process while the process is running, each of the plurality of reference indicators referencing a respective computing resource; generating, for display on a user interface, first values indicating the plurality of reference indicators that are generated and terminated; determining that a set of reference indicators that are generated but are not terminated exceed a performance issue threshold associated with a resource leak; and based at least in part on the determining that the set of reference indicators exceed the performance issue threshold, generating, for display on the user interface, a second value indicating a performance issue associated with the performance issue threshold.

2. The system of claim 1, wherein the method further comprises: receiving a first indication that the process has been requested to be shut down; based on the first indication, receiving a second indication that an operating system kernel will remove the set of reference indicators; and detecting a resource leak based at least in part on the first indication and the second indication.

3. The system of claim 2, wherein the performance issue threshold is a count threshold such that a quantity of the set of reference indicators that exceeds the count threshold is indicative of too many reference indicators that are generated but not removed.

4. The system of claim 3, the method further comprising generating a message indicating the set of reference indicators have exceeded the count threshold and is associated with the resource leak.

5. The system of claim 1, wherein the reference indicator is one of a graphics object identifier and a user handle.

6. The system of claim 1, the method further comprising generating a mapping for a reference indicator to a category that the reference indicator belongs to and providing, for display to the user interface, the category as a column identifier.

7. The system of claim 1, wherein the determining that the set of reference indicators that are generated but not terminated occurs while the process is still running.

8. The system of claim 1, the method further comprising determining a location in a call stack for which the performance issue is detected and cause display to the user interface of the location.

9. The system of claim 1, wherein the determining that the set of reference indicators is generated but not terminated is only an indication that there might be the resource leak, and wherein the resource leak is not definitively determined until the process is shutdown.

* * * * *